United States Patent [19]
Sakai et al.

[11] Patent Number: 5,954,173
[45] Date of Patent: Sep. 21, 1999

[54] DRIVE FORCE TRANSMISSION APPARATUS

[75] Inventors: Toshifumi Sakai, Okazaki; Kunihiko Suzuki, Gamagoori; Naoyuki Kokubo, Aichi; Masayuki Shimada, Takahama; Tomohiro Maruyama, Hekinan; Hisashi Fukuchi, Toyota; Satoshi Ashida, Toyota; Hirokazu Suzuki, Toyota; Tomoyuki Kano, Toyota, all of Japan

[73] Assignees: Toyoda Koki Kabushiki Kaisha, Kariya; Toyota Jidosha Kabushiki Kaisha, Toyota, both of Japan

[21] Appl. No.: 08/895,276

[22] Filed: Jul. 16, 1997

[30] Foreign Application Priority Data

Jul. 17, 1996 [JP] Japan ................... 8-187925

[51] Int. Cl.⁶ .................. F16D 43/284; B60K 17/348
[52] U.S. Cl. .................. 192/35; 192/48.2; 192/54.52; 192/103
[58] Field of Search .................. 192/35, 83, 48.2, 192/48.7, 54.52, 58.42, 70.23, 84.7, 84.96, 103

[56] References Cited

U.S. PATENT DOCUMENTS

| 2,933,171 | 4/1960 | Kraeplin . |
| 3,419,118 | 12/1968 | Allaben, Jr. . |
| 4,718,303 | 1/1988 | Fogelberg . |
| 4,781,078 | 11/1988 | Blessing et al. . |
| 4,807,732 | 2/1989 | Lehle . |
| 4,817,751 | 4/1989 | Asano, et al. . |
| 4,905,808 | 3/1990 | Tomita, et al. . |
| 4,938,306 | 7/1990 | Sumiyoshi et al. . |
| 4,960,011 | 10/1990 | Asano, et al. . |
| 5,007,885 | 4/1991 | Yamamoto, et al. . |
| 5,031,743 | 7/1991 | Morishita, et al. . |
| 5,056,640 | 10/1991 | Yamamoto . |
| 5,083,986 | 1/1992 | Teraoka, et al. . |
| 5,148,903 | 9/1992 | Kobayashi et al. . |
| 5,197,583 | 3/1993 | Sakai, et al. . |
| 5,326,333 | 7/1994 | Niizawa, et al. . |
| 5,464,084 | 11/1995 | Aoki et al. .................. 192/35 |
| 5,690,201 | 11/1997 | Gassmann . |
| 5,720,375 | 2/1998 | Maeda et al. .................. 192/35 |

FOREIGN PATENT DOCUMENTS

| 0 480 175 | 4/1992 | European Pat. Off. . |
| 0612929 | 8/1994 | European Pat. Off. . |
| 2-78824 | 6/1990 | Japan . |
| 5-12767 | 2/1993 | Japan . |
| 5-202963 | 8/1993 | Japan . |
| 782495 | 9/1957 | United Kingdom . |
| 21 61 872 | 1/1986 | United Kingdom . |
| 23 13 169 | 11/1997 | United Kingdom . |

*Primary Examiner*—Richard M. Lorence
*Attorney, Agent, or Firm*—Oblon, Spivak McClelland, Maier & Neustadt, P.C.

[57] ABSTRACT

There is disclosed a drive force transmission apparatus which includes a first pressing-force generation unit for generating a pressing force in accordance with a rotational speed difference between driving and driven shafts, and a frictional clutch which is brought into an engaged state by the pressing force generated by the first pressing-force generation unit in order to transmit torque in accordance with the rotational speed difference between the driving and driven shafts. The drive force transmission apparatus further includes a second pressing-force generation unit disposed opposite to the first pressing-force generation unit with respect to the frictional clutch. When needed, the second pressing-force generation, unit is operated to bring the frictional clutch into a firmly engaged state, thereby improving the traveling performance of the vehicle under severe traveling conditions, such as an attempt to extract a wheel trapped in a gutter or the like, traveling on a rough road, traveling on sand, etc.

6 Claims, 21 Drawing Sheets

DRIVE FORCE TRANSMISSION APPARATUS

BACKGROUND OF THE INVENTION

1. Field of the Invention

The present invention relates to a drive force transmission apparatus disposed between a driving shaft and a driven shaft in a four-wheel-drive vehicle in order to transmit torque therebetween.

2. Description of the Related Art

One type of drive force transmission apparatus is disclosed in Japanese Utility Model Application Laid-Open No. 5-12767. Such a drive force transmission apparatus comprises an inner rotatable member and an outer rotatable member, which are supported coaxially and in a relatively rotatable manner with each connected to either a driving shaft or a driven shaft, a frictional clutch provided between the inner and outer rotatable members in order to transmit torque therebetween through frictional engagement, and pressing-force generation means provided between the inner and outer rotatable members for generating a pressing force in accordance with a rotational speed difference between the driving and driven shafts and for transmitting the pressing force to the frictional clutch to thereby frictionally engage the frictional clutch.

In this type of drive force transmission apparatus, when relative rotation occurs between the driving and driven shafts due to the occurrence of a rotational speed difference therebetween, a pressing force is generated in the pressing-force generation means in accordance with a rotational speed difference between the shafts. The thus-generated pressing force is transmitted to the frictional clutch, causing the frictional clutch to become frictionally engaged. As a result, the transmission of torque is established between the driving and driven shafts in accordance with the rotational speed difference therebetween. Thus, the vehicle equipped with the drive force transmission apparatus enters standby four-wheel-drive (standby 4WD).

When this type of drive force transmission apparatus is employed in a four-wheel-drive vehicle, in addition to the transmission of a drive force in accordance with a rotational speed difference between the front and rear wheels during normal traveling, the following operations are preferably established. Under severe traveling conditions, such as an attempt to extract a wheel trapped in a gutter or the like, traveling on a rough road, traveling on sand, etc., the frictional clutch is engaged. Also, when control by the anti-lock brake system (ABS), vehicle stabilization control, or like control is performed, a drive force to be transmitted is made zero or very small, so that such control is performed smoothly while a disturbance is avoided.

Accordingly, when the torque transmission characteristics of a drive force transmission apparatus for use in a four-wheel-drive vehicle are fixed regardless of traveling conditions of the vehicle, the apparatus fails to satisfactorily cope with various traveling conditions of the vehicle as described above.

In the drive force transmission apparatus disclosed in the above publication, in order to smoothly perform control by ABS, vehicle stabilization control, or like control, there is employed means for controlling the volume of a fluid chamber which constitutes the pressing-force generation means and contains a viscous fluid. The volume of the fluid chamber is increased as needed to thereby limit the generation of a fluid pressure in the fluid chamber even when a rotational speed difference exists between the driving and driven shafts, so that the frictional clutch is restrained or prevented from being frictionally engaged by a pressing force induced by the fluid pressure.

The above-mentioned drive force transmission apparatus employs means for varying the volume of the fluid chamber through advancement/retreat of a plunger facing the fluid chamber. However, it is difficult to directly control the volume of the fluid chamber. Also, it is difficult for such means to engage the frictional clutch in order to cope with severe driving conditions, such as an attempt to extract a wheel trapped in a gutter or the like, traveling on a rough road, traveling on sand, etc.

SUMMARY OF THE INVENTION

The present invention has been accomplished to solve the above-mentioned problems and an object of the present invention is to provide a drive force transmission apparatus in which the frictional clutch is instantaneously brought into a connected state as needed, thereby improving the traveling performance of the vehicle under severe traveling conditions, such as an attempt to extract a wheel trapped in a gutter or the like, traveling on a rough road, traveling on sand, etc.

The present invention can be applied to a drive force transmission apparatus which includes, as basic structural elements, an inner rotatable member and an outer rotatable member, which are supported coaxially and in a relatively rotatable manner with each connected to either a driving shaft or a driven shaft, a frictional clutch provided between the inner and outer rotatable members in order to transmit torque therebetween through frictional engagement, and pressing-force generation means provided between the inner and outer rotatable members for generating a pressing force in accordance with a rotational speed difference between the driving and driven shafts and for transmitting the pressing force to the frictional clutch to thereby bring the frictional clutch into a frictionally engaged state.

A drive force transmission apparatus according to the present invention includes, in addition to the above-described basic structural elements, second pressing-force generation means, located opposite to the pressing-force generation means with respect to the frictional clutch, for generating a pressing force to bring the frictional clutch into a frictionally engaged state and control means for controlling the second pressing-force generation means.

Accordingly, in the case where the second pressing-force generation means is inactive, when relative rotation occurs between the inner and outer rotatable members due to a rotational speed difference between the driving and driven shafts, a pressing force is generated in the pressing-force generation means (hereinafter may be referred to as the first pressing-force generation means) in accordance with a rotational speed difference between the driving and driven shafts. The thus-generated pressing force is applied to the frictional clutch.

As a result, a torque corresponding to the rotational speed difference is transmitted from the driving shaft to the driven shaft in a vehicle. Thus, in the case where the second pressing-force generation means is inactive, the vehicle is in real-time four-wheel-drive.

On the other hand, in the case where the second pressing-force generation means is activated by the control means, a pressing force to press the frictional clutch is generated in the second pressing-force generation means. This pressing force acts on the frictional clutch against the first pressing-force generation means to thereby bring the frictional clutch into a frictionally engaged state. The magnitude of the pressing force generated in the second pressing-force generation means can be controlled by the control means. Through generation of a large pressing force in the second pressing-force generation means under control of the control means, the frictional clutch can be brought into a completely engaged state.

Accordingly, when the vehicle must undergo severe traveling conditions, such as an attempt to extract a wheel trapped in a gutter or the like, traveling on a rough road, traveling on sand, etc., the second pressing-force generation means is intentionally activated by the control means to thereby instantaneously bring the frictional clutch into a frictionally engaged state, whereby the vehicle enters four-wheel-drive. In other words, when the vehicle encounters severe traveling conditions, the traveling performance of the vehicle can be easily changed to a suitable one.

Preferably, the second pressing-force generation means comprises a second frictional clutch, whose frictionally engagement is controlled by the control means, and pressing-force conversion means for converting a frictional engagement force of the second frictional clutch to a pressing force applied to the frictional clutch. Preferably, the control means comprises a movable member for pressing the second frictional clutch through movement thereof and an electromagnet for controlling the movement of the movable member. In this case, the above-described action and effects can be easily obtained.

Preferably, the drive force transmission apparatus further comprises force-transmission limiting means for limiting the transmission of a pressing force generated by the pressing-force generation means to the frictional clutch when a rotational speed difference between the driving and driven shafts is small. In this case, control by ABS, vehicle stabilization control, or like control can be performed smoothly.

In another drive force transmission apparatus according to the present invention, the frictional clutch is disposed between an intermediate rotatable member and the inner rotatable member, the intermediate rotatable member being coaxially and movably disposed in the outer rotatable member; the second pressing-force generation means comprises cam means, which is disposed between the outer rotatable member and the intermediate rotatable member and presses the intermediate rotatable member against the frictional clutch in accordance with relative rotation between the outer rotatable member and the intermediate rotatable member; and the control means comprises a connection member for selectively connecting the outer rotatable member and the intermediate rotatable member to either the driving shaft or the driven shaft.

Accordingly, in the case where the intermediate rotatable member is connected to either the driving or driven shaft via the connection member, the function of the cam means becomes ineffective. Consequently, the frictional clutch is subjected to a pressing force which is generated by the first pressing-force generation means in accordance with a rotational speed difference between the driving and driven shafts, so that the vehicle is in real-time four-wheel-drive. In the case where the outer rotatable member is connected to either the driving or driven shaft via the connection member, the function of the cam means becomes effective. Consequently, the frictional clutch becomes firmly engaged to thereby improve the traveling performance of the vehicle under severe traveling conditions.

Preferably, the second pressing-force generation means comprises first cam means, which is operated by the control means to press the frictional clutch, and second cam means, which is located between the frictional clutch and the pressing-force generation means (first pressing-force generation mean) and is operated by the control means to press the frictional clutch; and the control means can selectively establish a state in which both the first and second cam means are inactive, a state in which only the first cam means is active, or a state in which both the first and second cam means are active.

Accordingly, upon selection of a state in which both the first and second cam means are inactive, even when a pressing force is generated in the first pressing-force generation means due to the occurrence of relative rotation between the inner and outer rotatable members, the generated pressing force is shut off by the second cam means, and consequently the frictional clutch is not brought into a frictionally engaged state. Thus, the vehicle is in two-wheel-drive, wherein only wheels on the driving shaft side are driven, so that it becomes possible to properly cope with braking, ABS, vehicle stabilization control, and the like.

Upon selection of a state in which only the first cam means is active, when a pressing force is generated in the first pressing-force generation means due to the occurrence of relative rotation between the inner and outer rotatable members, the generated pressing force is transmitted to the frictional clutch via the second cam means, and consequently the frictional clutch is brought into a frictionally engaged state to thereby transmit torque from the driving shaft to the driven shaft. Thus, the vehicle is in real-time four-wheel-drive, so that it becomes possible to properly cope with normal traveling.

Upon selection of a state in which both the first and second cam means are active, when a pressing force is generated in the first pressing-force generation means due to the occurrence of relative rotation between the inner and outer rotatable members, the generated pressing force is transmitted to the frictional clutch via the second cam means, and consequently the frictional clutch is brought into a frictionally engaged state to thereby transmit torque from the driving shaft to the driven shaft. Thus, the vehicle is in real-time four-wheel-drive. Further, since both the first and second cam means are activated by the control means, a pressing force is applied to the frictional clutch from both sides thereof to thereby establish a completely engaged state of the frictional clutch. Accordingly, the vehicle is in complete four-wheel-drive, wherein the frictional clutch is in a completely engaged state, thereby enabling the vehicle to cope with severe traveling conditions, such as an attempt to extract a wheel trapped in a gutter or the like, traveling on a rough road, traveling on sand, etc.

Another drive force transmission apparatus according to the present invention includes, in addition to the above-described basic structural element, force-transmission limiting means for limiting the transmission of a pressing force generated by the pressing-force generation means to the frictional clutch. In this case, a pressing force generated by the pressing-force generation means due to relative rotation between the inner and outer rotatable members is restrained by the force-transmission limiting means from being transmitted to the frictional clutch, and is transmitted to the frictional clutch to engage the frictional clutch only when the generated pressing force is in excess of a counter force imposed by the force-transmission limiting means. Accordingly, when a rotational speed difference between the driving and driven shafts is relatively small, no torque is transmitted from the driving shaft to the driven shaft. Thus, the vehicle is in two-wheel-drive, wherein only wheels on the driving shaft side are driven, so that it becomes possible to properly cope with braking, ABS, vehicle stabilization control, and the like.

Preferably, the force-transmission limiting means comprises a movable member interposed between the frictional clutch and the pressing-force generation means and control means for controlling movement of the movable member. In this case, the above-described action and effects can be easily obtained.

Still another drive force transmission apparatus according to the present invention includes the above-described basic structural elements, and the pressing-force generation means comprises an operating piston, which is disposed between the inner and outer rotatable members in a fluid-tight and axially movable manner and which advances toward and retreats from the frictional clutch, a fluid chamber, which is defined by the operating piston and the inner and outer rotatable members with a predetermined gap maintained in an axial direction and which contains a viscous fluid, and a rotor, which is accommodated in the fluid chamber and which advances the operating piston to press the frictional clutch in accordance with relative rotation between the inner and outer rotatable members. The apparatus further includes fixing means for releasably fixing the rotor onto the inner rotatable member and control means for controlling the fixing function of the fixing means.

Accordingly, when relative rotation occurs between the inner and outer rotatable members while the rotor is fixed on the inner rotatable member, a pressing force corresponding to the relative rotation is generated in the pressing-force generation member. The thus-generated pressing force is transmitted to the frictional clutch to bring the frictional clutch into a frictionally engaged state, so that a torque is transmitted from the driving shaft to the driven shaft in accordance with rotational speed difference therebetween. Thus, the vehicle is in real-time four-wheel-drive, so that it becomes possible to properly cope with normal driving.

In the case where the rotor is released from the inner rotatable member, even when relative rotation occurs between the inner and outer rotatable members, the rotor does not rotate relatively. Thus, no pressing force is generated in the pressing-force generation means, so that the frictional clutch is not brought into a frictionally engaged state. Accordingly, even when a rotational speed difference occurs between the driving and driven shafts, no torque is transmitted therebetween. Thus, the vehicle is in two-wheel-drive, wherein only wheels on the driving shaft side are driven, so that it becomes possible to properly cope with braking, ABS, vehicle stabilization control, and the like.

Preferably, the fixing means comprises a pair of holding members, which are supported by the inner rotatable member in an integrally rotatable and axially slidable manner and which face the fluid chamber as well as both sides of the rotor, and an urging member for urging one of the holding members against the rotor; and the control means comprises a frictional clutch, drive means for controlling the frictional engagement of the frictional clutch, and cam means for converting a frictional engagement force of the frictional clutch to a thrust for thrusting the other holding member against the rotor. In this case, the above-described action and effects can be easily obtained.

Preferably, the drive means, which constitutes the control means, comprises a movable member which is driven by a magnetic force to press the frictional clutch. In this case, the above-described action and effects can be easily obtained.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENTS

Figure 1:
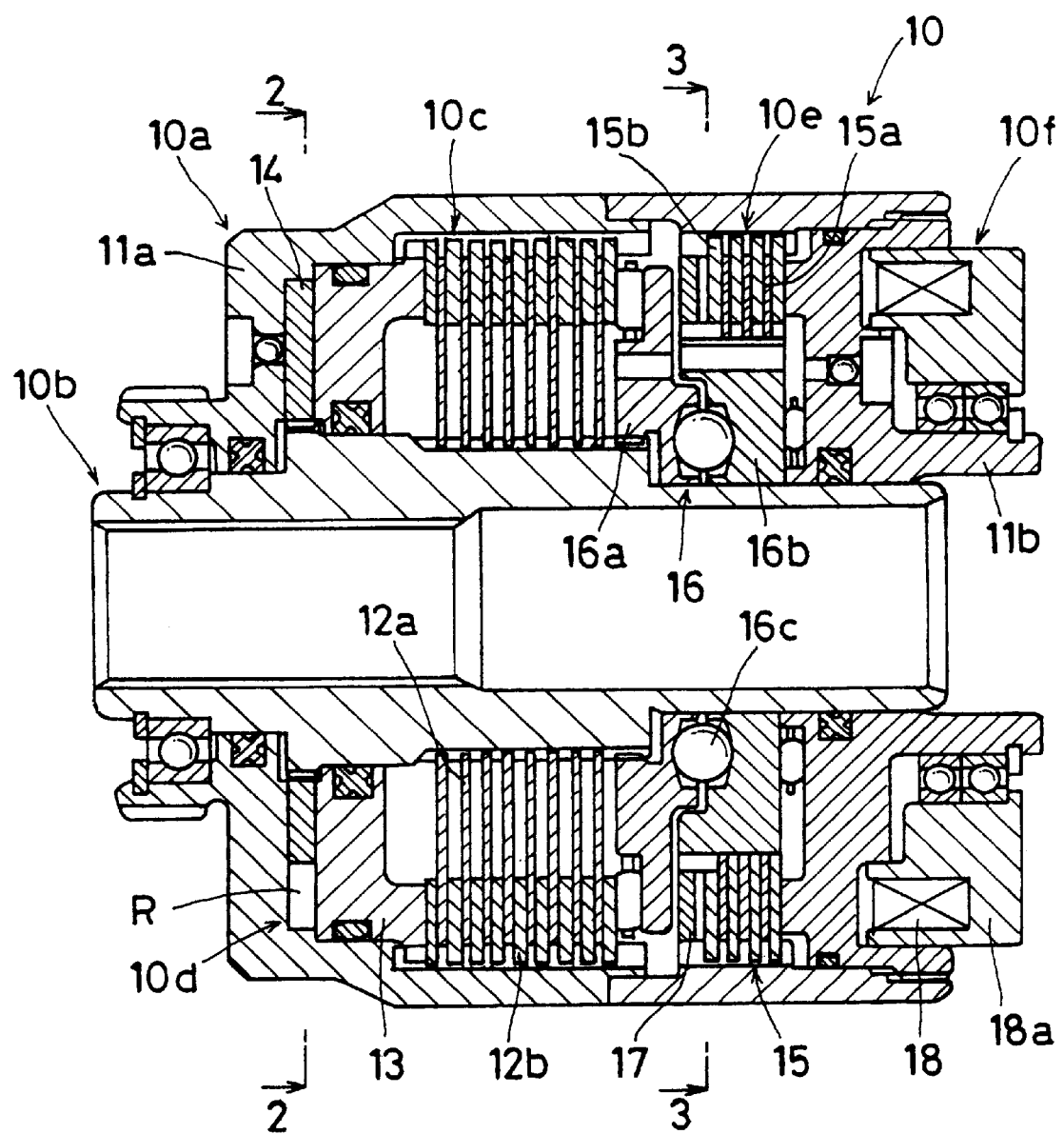
FIG. 1 is a sectional view showing a drive force transmission apparatus according to a first embodiment of the present invention.
Figure 15:
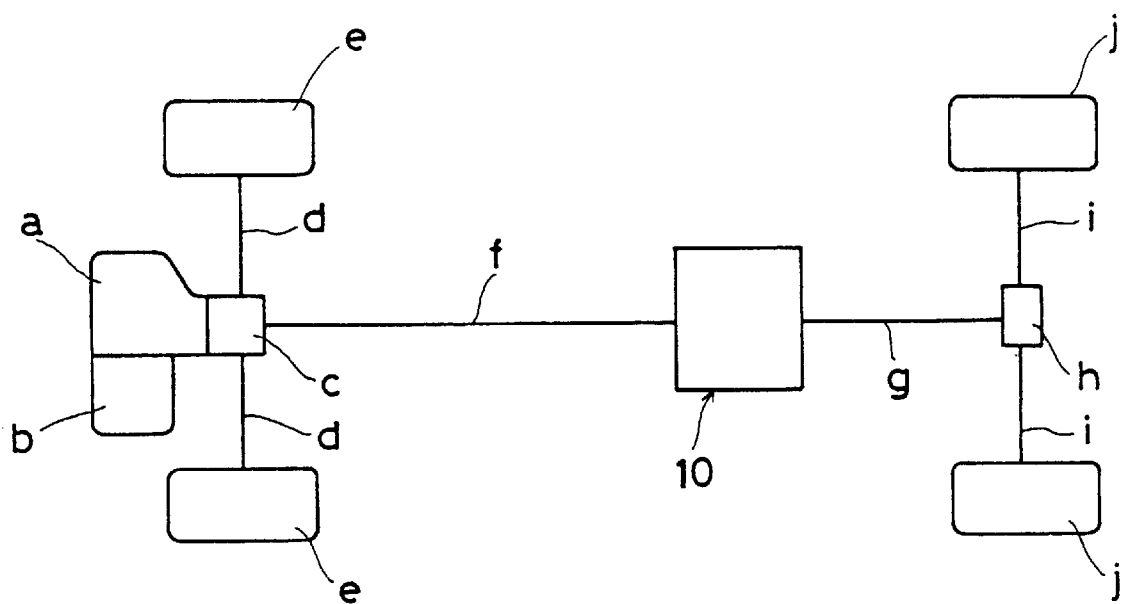
FIG. 15 is a schematic diagram showing a four-wheel-drive vehicle equipped with the drive force transmission apparatus according to the first embodiment.

Embodiments of the present invention will now be described in detail with reference to the drawings. FIG. 1 shows a drive force transmission apparatus according to a first embodiment of the present invention. As shown in FIG. 15, a drive force transmission apparatus 10 is disposed in a drive force transmission path for transmitting a drive force to rear wheels of a real-time four-wheel-drive vehicle.

In this vehicle, a trans-axle a that includes a transmission and a transfer transmits a drive force of engine b to both axle shafts d via front differential c to thereby drive front wheels e and also outputs the drive force to first propeller shaft f.

The first propeller shaft f is connected to second propeller shaft g via the drive force transmission apparatus 10. When the first and second propeller shafts f and g are connected together in a torque transmittable manner, a drive force is transmitted to rear differential h and then to both axle shafts i for driving rear wheels j. In this vehicle, the first propeller shaft f corresponds to a driving shaft in the present invention, and the second propeller shaft g corresponds to a driven shaft in the present invention.

As shown in FIG. 1, the drive force transmission apparatus 10 includes an outer housing 10a serving as an outer rotatable member, an inner shaft 10b serving as an inner rotatable member, a main clutch 10c serving as a frictional clutch, first pressing-force generation means 10d, second pressing-force generation means 10e, and control means 10f.

The outer housing 10a is composed of a bottomed cylindrical outer case 11a and a cover member 11b which is attached to the opening portion of the outer case 11a through screw engagement to thereby cover the opening portion. The inner shaft 10b passes through the cover member 11b at the central portion thereof in a fluid-tight manner and extends through the outer case 11a such that it is rotatably supported while an axial movement thereof is limited. The first propeller shaft f is connected to the front end portion of the outer case 11a in a torque-transmittable manner. The second propeller shaft g is inserted into a bore formed in the inner shaft 10b so as to be connected thereto in a torque-transmittable manner.

As shown in FIG. 1, the main clutch 10c is a wet type frictional multiple-disc clutch including a number of clutch discs 12a and clutch plates 12b. Each clutch disc 12a is spline-engaged with the outer circumference of the inner shaft 10b in an axially movable manner. Each clutch plate 12b is spline-engaged with the inner circumference of the outer case 11a in an axially movable manner. The clutch discs 12a and the clutch plates 12b are mutually interleaved so as to abut each other for frictional engagement or to separate from each other for disengagement.

Figure 2:
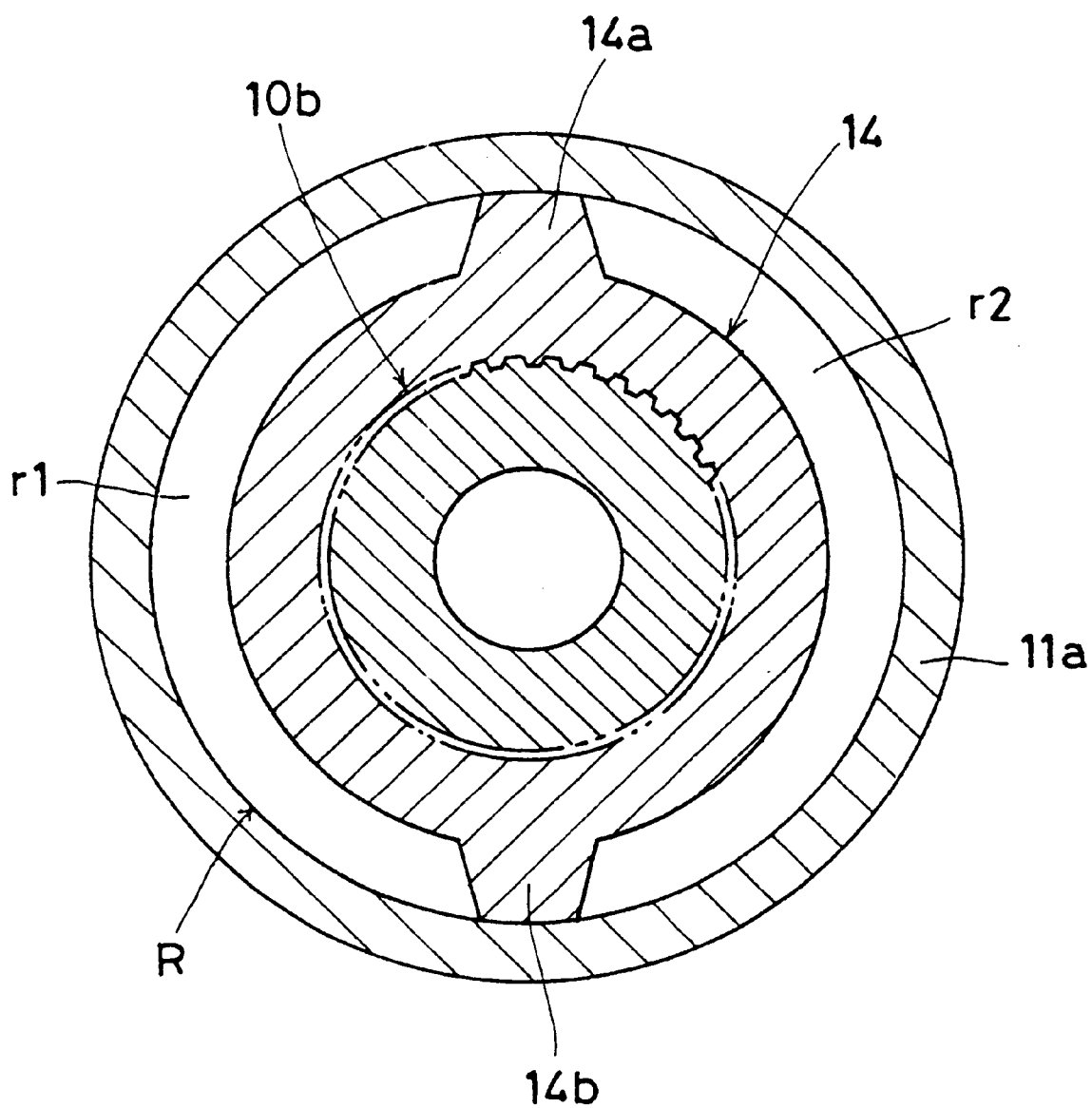
FIG. 2 is a sectional view taken along line 2—2 of FIG. 1.

As shown in FIGS. 1 and 2, the first pressing-force generation means 10d includes an operating piston 13, a rotor 14, and a viscous fluid contained in a fluid chamber R. The operating piston 13 is disposed within the outer housing 10a in a fluid-tight manner to surround the outer circumference of the inner shaft 10b such that the operating piston 13 is rotatable and axially movable relative to the inner shaft 10b and is axially movable and integrally rotatable relative to the outer case 11a. The thus-attached operating piston 13, together with the outer case 11a, defines the fluid chamber R.

As shown in FIG. 2, the rotor 14 has two vane portions 14a and 14b extending radially and is accommodated in the fluid chamber R while being fixed on the outer circumference of the inner shaft 10b. The vane portions 14a and 14b divide the fluid chamber R into two sub-chambers r1 and r2, each of which contains a highly viscous fluid.

The second pressing-force generation means 10e includes a pilot clutch 15 serving as a frictional clutch and a cam mechanism 16 serving as pressing-force conversion means. The control means 10f includes an armature 17 serving as a movable member and an electromagnet 18.

The cam mechanism 16 includes first and second cam members 16a and 16b, and ball-shaped cam followers 16c. The first cam member 16a is supported by the inner shaft 10b in an integrally rotatable and axially movable manner and is positioned opposite to the operating piston 13 with respect to the main clutch 10c. The second cam member 16b is rotatably supported by the inner shaft 10b and is positioned between the first cam member 16a and the cover member 11b.

Figure 3:
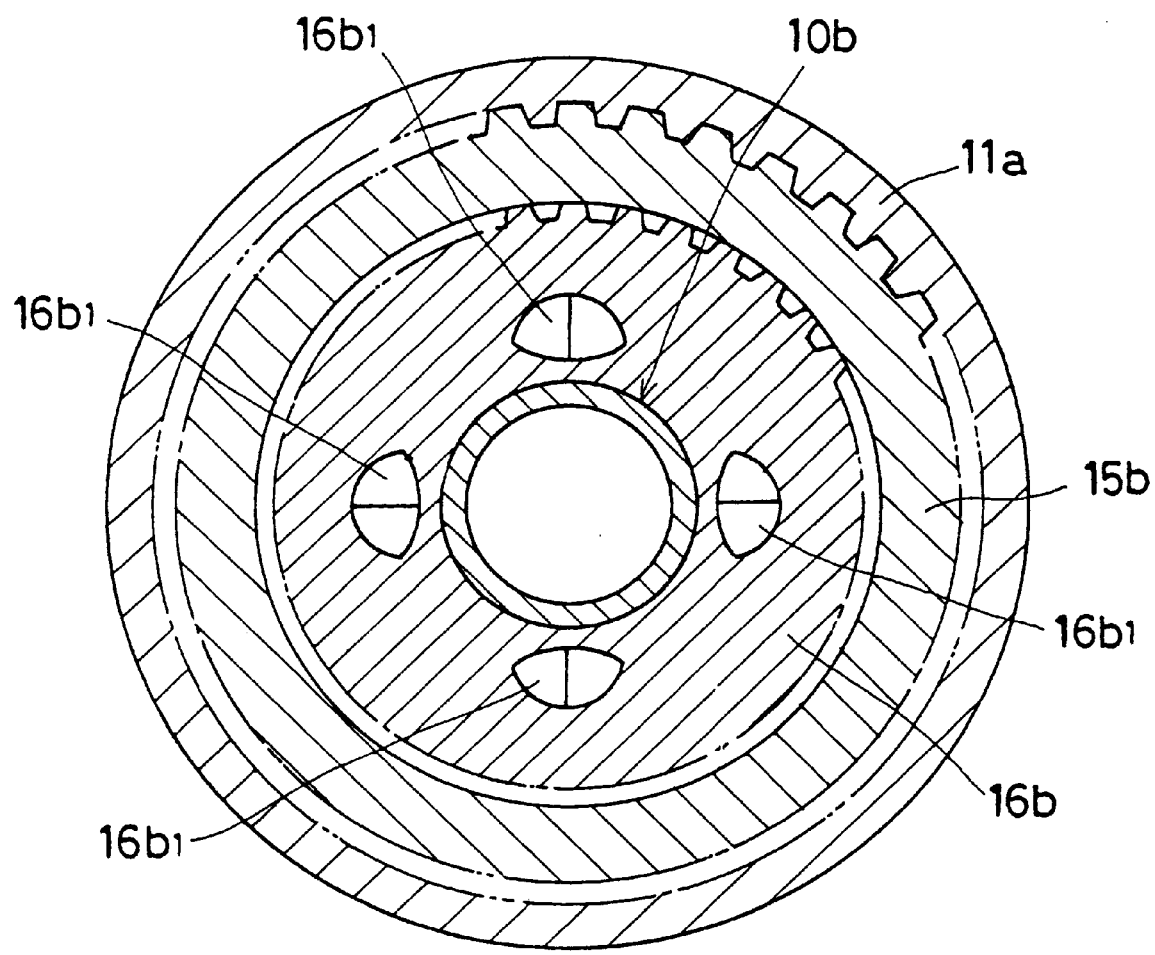
FIG. 3 is a sectional view taken along line 3—3 of FIG. 1.
Figure 4:
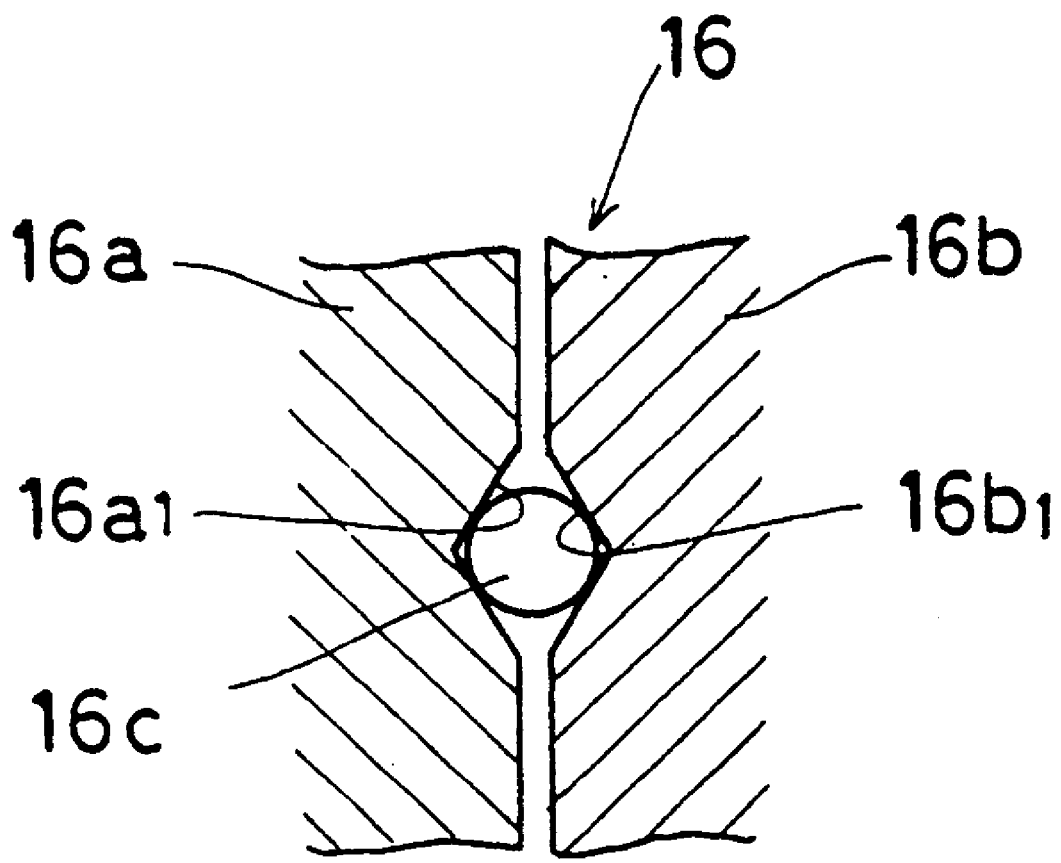
FIG. 4 is a sectional view of a cam mechanism which constitutes the drive force transmission apparatus of FIG. 1.

The second cam member 16b has a smaller diameter than the first cam member 16a, and the pilot clutch 15 is disposed between the outer circumference of the second cam member 16b and the inner circumference of the outer case 11a such that the pilot clutch 15 faces the first cam member 16a. As shown in FIGS. 3 and 4, cam grooves 16a1 and 16b1 are formed in the opposed surfaces of the first and second cam members 16a and 16b, respectively. The cam followers 16c are accommodated in both the cam grooves 16a1 and 16b1.

The pilot clutch 15 is a wet type frictional multiple-disc clutch including a plurality of clutch discs 15a and clutch plates 15b. Each clutch disc 15a is spline-engaged with the outer circumference of the second cam member 16b in an axially movable manner. Each clutch plate 15b is spline-engaged with the inner circumference of the outer case 11a in an axially movable manner. The clutch discs 15a and the clutch plates 15b are mutually interleaved so as to abut each other for frictional engagement or to separate from each other for disengagement.

The annular armature 17, which is part of the control means 10f, is disposed between the first cam member 16a and the pilot clutch 15 in an axially movable manner such that it surrounds the outer circumference of the second cam member 16b. The electromagnet 18, which is part of the control means 10f and has an annular shape, is fitted into a support member 18a, which is rotatably supported by the inner shaft 10b on the outer side of the cover member 11b. The electromagnet 18 is opposed to the cover member 11b, the pilot clutch 15, and the armature 17.

Thus, in the control means 10f, when the electromagnet 18 is energized, a magnetic field is generated through the electromagnet 18, the pilot clutch 15, and the armature 17, so that the armature 17 and the pilot clutch 15 are attracted toward the electromagnet 18 due to magnetic induction.

In the drive force transmission apparatus 10 having the above-described structure, when the electromagnet 18, which constitutes the control means 10f, is de-energized, the pilot clutch 15 and the armature 17 are in a free state, and both the cam members 16a and 16b are integrally rotatable with the inner shaft 10b via the cam followers 16c. In this state, the pilot clutch 15 and the cam mechanism 16 do not operate.

Accordingly, in the vehicle equipped with the drive force transmission apparatus 10, when relative rotation occurs between the outer housing 10a and the inner shaft 10b in association with the occurrence of a rotational speed difference between the propeller shafts f and g, the rotor 14, which constitutes the first pressing-force generation means 10d, makes relative rotation to the outer housing 10a within the fluid chamber R to thereby generate a pressing force corresponding to the rotational speed difference between the propeller shafts f and g. The thus-generated pressing force presses the operating piston 13 against the main clutch 10c, so that the main clutch 10c engages frictionally in accordance with the rotational speed difference.

Accordingly, the first propeller shaft f is connected to the second propeller shaft g via the outer housing 10a, the main clutch 10c, and the inner shaft 10b to thereby transmit a torque, which corresponds to the rotational speed difference between the first and second propeller shafts f and g, from the first propeller shaft f to the second propeller shaft g. Thus, the vehicle is in real-time four-wheel-drive.

On the other hand, in the drive force transmission apparatus 10, when the electromagnet 18, which constitutes the control means 10f, is energized, a magnetic field is generated through the electromagnet 18, the pilot clutch 15, and the armature 17, so that the armature 17 and the pilot clutch 15 are attracted toward the electromagnet 18 due to magnetic induction. As a result, the pilot clutch 15 engages frictionally to thereby connect the second cam member 16b to the outer case 11a, rendering the first cam member 16a and the second cam member 16b relatively rotatable. In this state, the second pressing-force generation means 10e operates effectively.

Accordingly, in the vehicle equipped with the drive force transmission apparatus 10, when relative rotation occurs between the outer housing 10a and the inner shaft 10b in association with the occurrence of a rotational speed difference between the propeller shafts f and g, a pressing force is generated not only in the first pressing-force generation means 10d but also in the second pressing-force generation means 10e.

That is, in the second pressing-force generation means 10e, when relative rotation occurs between the outer housing 10a and the inner shaft 10b, a frictional engagement force of the pilot clutch 15 causes a relative rotation between the first and second cam members 16a and 16b, so that the cam mechanism 16 operates and the cam follower 16c presses the first cam member 16a against the main clutch 10c. As a result, the main clutch 10c is pressed firmly from both sides by a pressing force generated by the first pressing-force generation means 10d and a pressing force generated by the opposite second pressing-force generation means 10e. Thus, the main clutch 10c is brought into a completely connected state through firm frictional engagement.

Accordingly, in the drive force transmission apparatus 10, the second pressing-force generation means 10e is rendered effective through the energizing of the electromagnet 18, which constitutes the control means 10f, so that upon the generation of a rotational speed difference between the propeller shafts f and g, the main clutch 10c is instantaneously brought into a connected state to bring the vehicle in four-wheel-drive, thereby improving the traveling performance of the vehicle under severe traveling conditions, such as an attempt to extract a wheel trapped in a gutter or the like, traveling on a rough road, traveling on sand, etc. Thus, when the vehicle encounters severe traveling conditions, the traveling performance thereof can be easily changed to that suitable for the severe traveling conditions.

Figure 16:
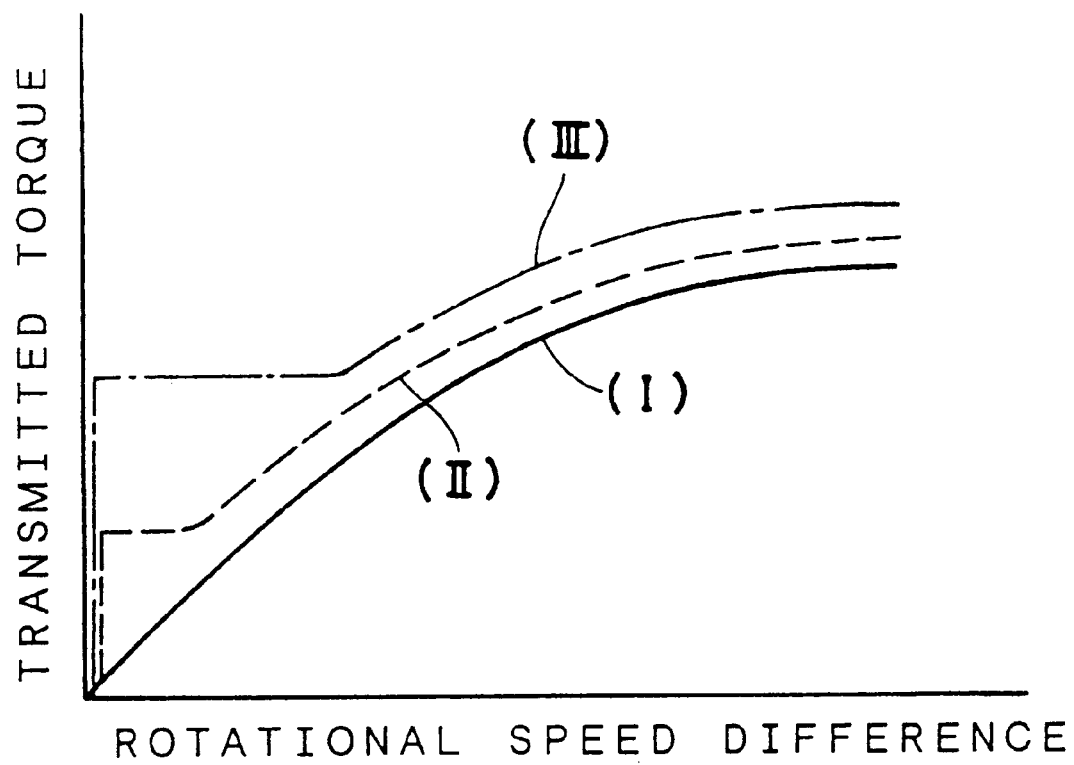
FIG. 16 is a graph showing torque transmission characteristics of the drive force transmission apparatus according to the first embodiment.

FIG. 16 shows a graph of torque transmission characteristics of the drive force transmission apparatus 10. In the graph, curve (I) represented by a solid line shows the relationship between a rotational speed difference and a transmission torque in the case where the function of the second pressing-force generation means 10e is rendered ineffective; and curve (II) represented by a dashed line and curve (III) represented by a dot-and-dash line show the relationship between a rotational speed difference and a transmission torque in the case where the function of the second pressing-force generation means 10e is rendered effective. The curve (II) shows the case of a relatively small current applied to the electromagnet 18, and the curve (III) shows the case of a relatively large current applied to the electromagnet 18.

Figure 5:
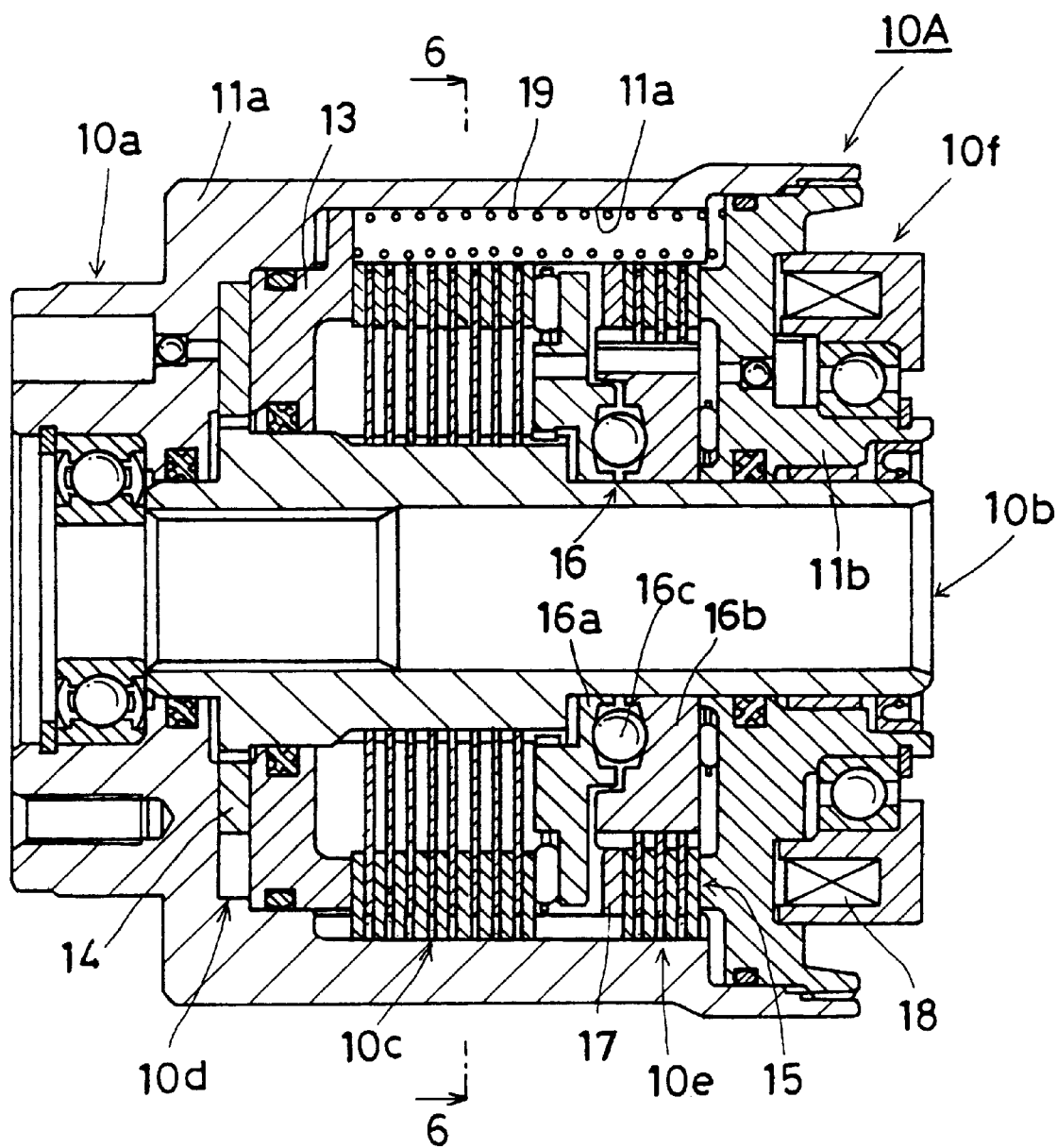
FIG. 5 is a sectional view showing a drive force transmission apparatus according to a second embodiment of the present invention.

FIG. 5 shows a drive force transmission apparatus according to a second embodiment of the present invention. A drive force transmission apparatus 10A has basically the same structure as that of the drive force transmission apparatus 10, but is different in that force-transmission limiting means is added for limiting the transmission of a pressing force from the first pressing-force generation means 10d to the main clutch 10c. Accordingly, in the drive force transmission apparatus 10A, the same component members and portions as those of the drive force transmission apparatus 10 are denoted by common numerals, and their detailed description is omitted. The description below primarily encompasses the force-transmission limiting means added to the drive force transmission apparatus 10A and relevant items.

Figure 6:
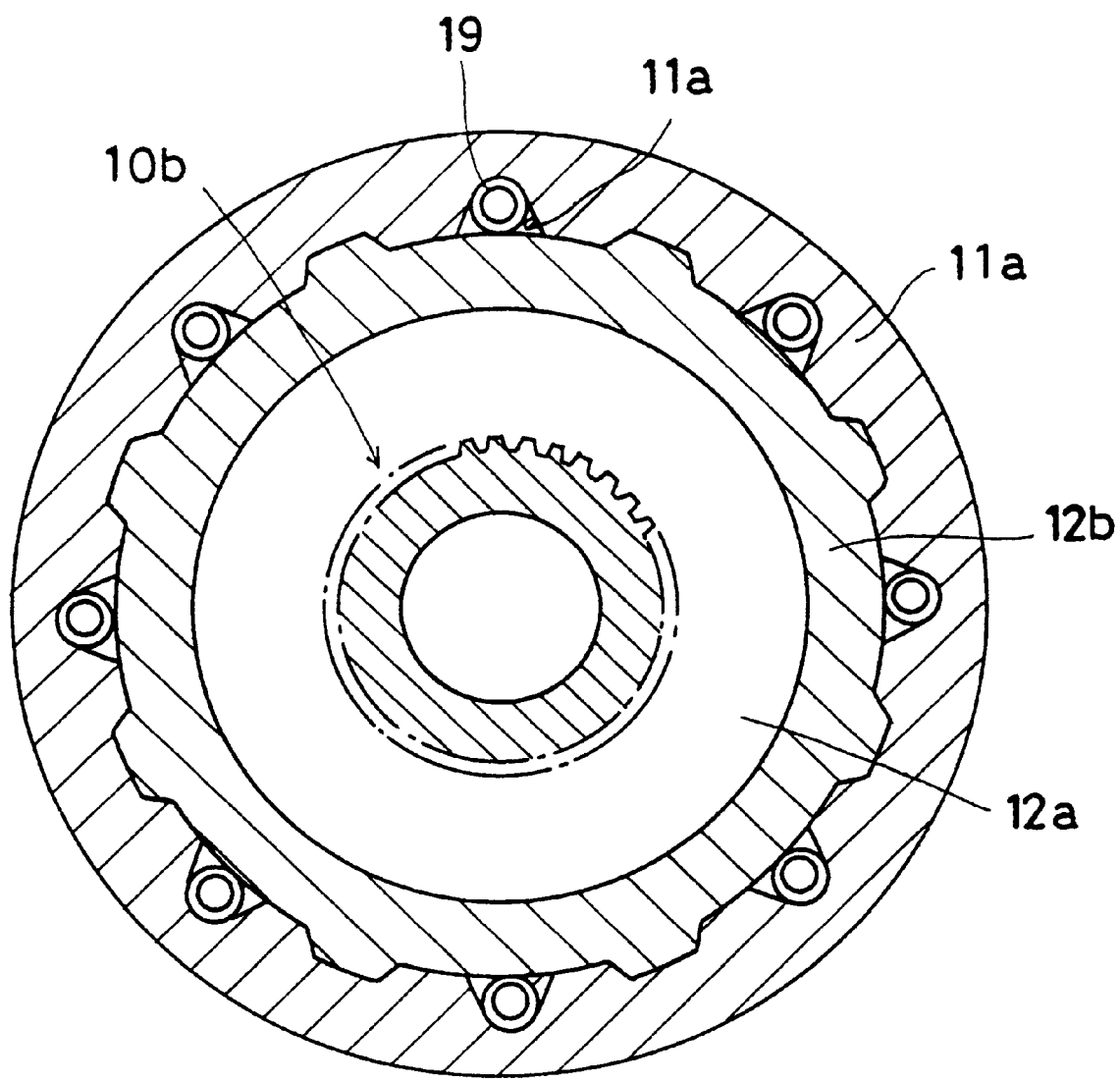
FIG. 6 is a sectional view taken along line 6—6 of FIG. 5.

As shown in FIGS. 5 and 6, in the drive force transmission apparatus 10A, a number of depressions 11a1 are formed in the inner circumference of an outer case 11a, which constitutes an outer housing 10a, at predetermined intervals in a circumferential direction, and a number of compression springs 19 are employed as the force-transmission limiting means. The depressions 11a1 formed in the outer case 11a extend in an axial direction of the outer case 11a. The compression springs 19 are accommodated in respective depressions 11a1. One end of each compression spring 19 resiliently abuts an operating piston 13, and the other end resiliently abuts a cover member 11b, thereby biasing the operating piston 13 with a predetermined force.

Accordingly, in the drive force transmission apparatus 10A, the transmission of a pressing force generated in the first pressing-force generation means 10d to the main clutch 10c is limited. Therefore, the pressing force is transmitted to the main clutch 10c when a pressing force generated by the first pressing-force generation means 10d and acting on the operating piston 13 exceeds a biasing force applied to the operating piston 13 by the compression springs 19.

Thus, in the drive force transmission apparatus 10A, while a rotational speed difference between the first and second propeller shafts f and g is relatively small, a torque corresponding to the rotational speed difference is not transmitted from the first propeller shaft f to the second propeller shaft g. As a result, the vehicle is in two-wheel-drive, thereby allowing smooth driving performance for braking, ABS, vehicle stabilization control, and the like.

Figure 17:
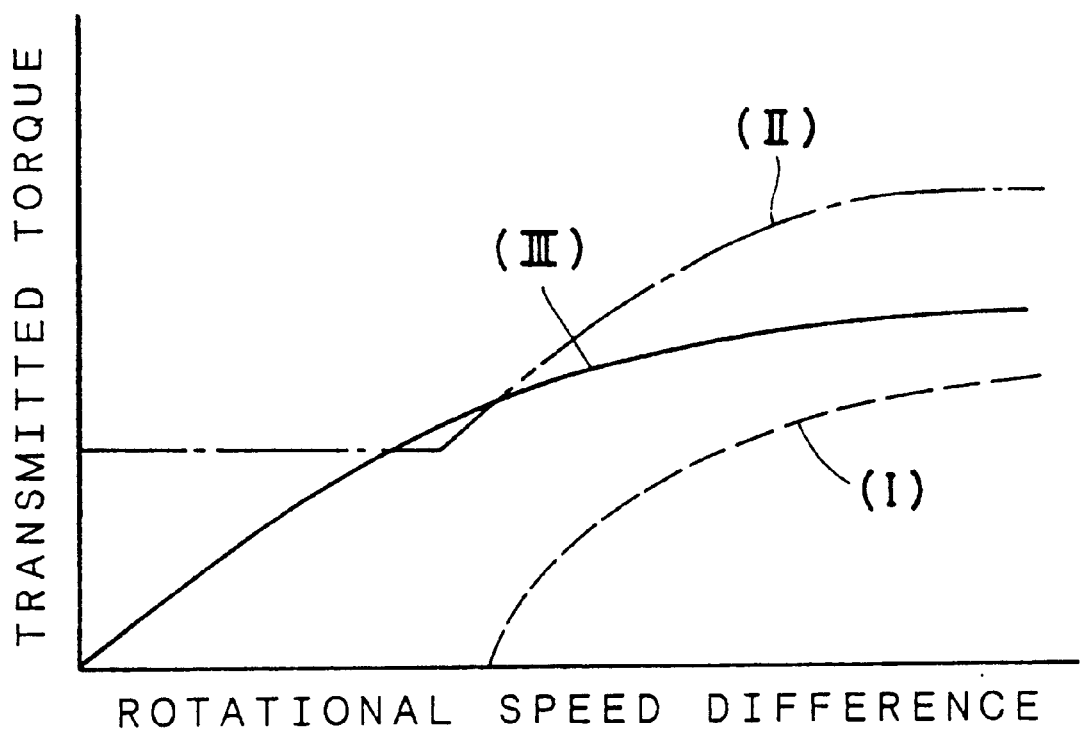
FIG. 17 is a graph showing torque transmission characteristics of the drive force transmission apparatus according to the second embodiment.

FIG. 17 shows a graph of torque transmission characteristics of the drive force transmission apparatus 10A. In the graph, curve (I) represented by a dashed line shows the relationship between a rotational speed difference and a transmission torque in the case where the function of the second pressing-force generation means 10e is rendered ineffective; and curve (II) represented by a dot-and-dash line shows the relationship between a rotational speed difference and a transmission torque in the case where the function of the second pressing-force generation means 10e is rendered effective. Curve (III) represented by a solid line shows the relationship between a rotational speed difference and a transmission torque in a conventional drive force transmission apparatus, which is equipped with neither the second pressing-force generation means 10e nor the compression springs 19 serving as force-transmission limiting means.

Figure 7:
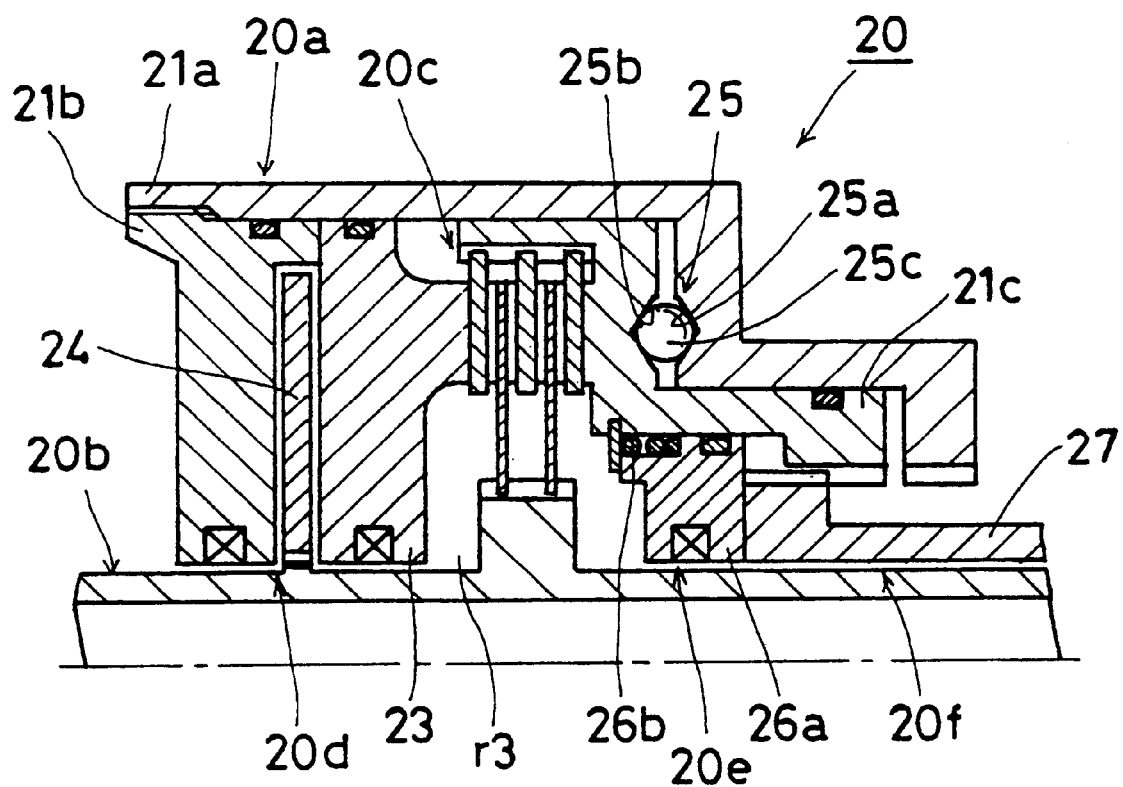
FIG. 7 is a partial sectional view showing essential portions of a drive force transmission apparatus according to a third embodiment of the present invention, illustrating a first connection state.
Figure 8:
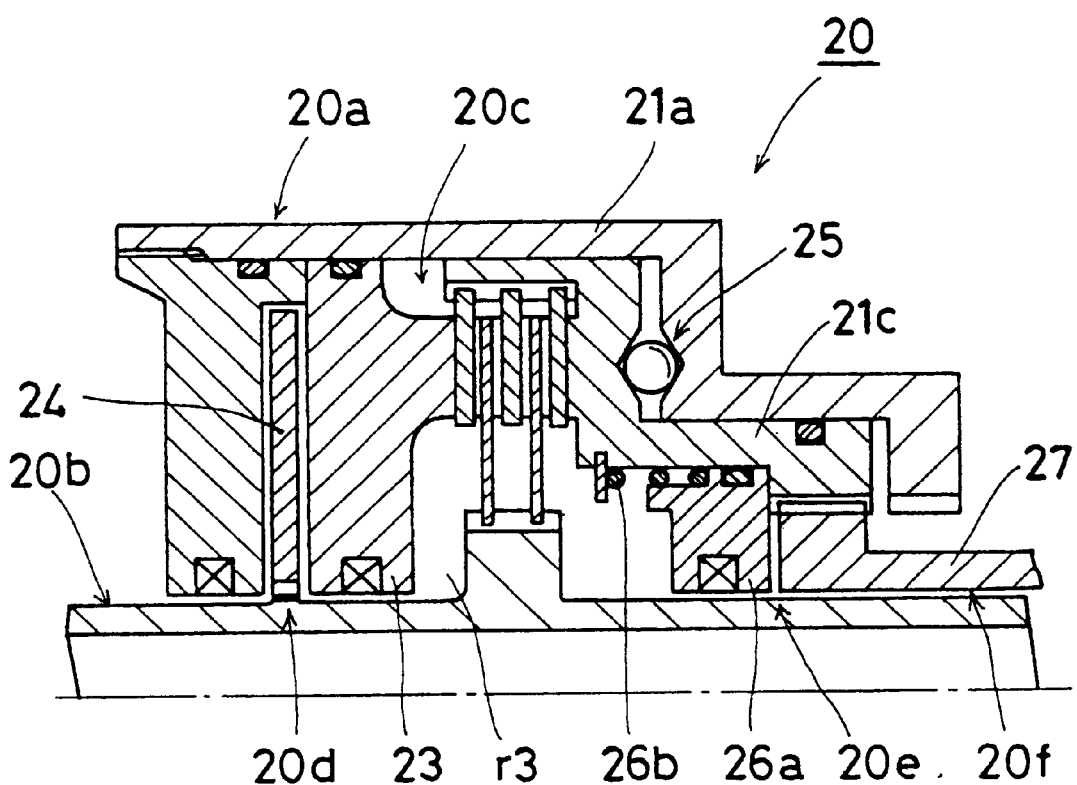
FIG. 8 is a partial sectional view showing essential portions of the drive force transmission apparatus according to the third embodiment, illustrating a second connection state.
Figure 9:
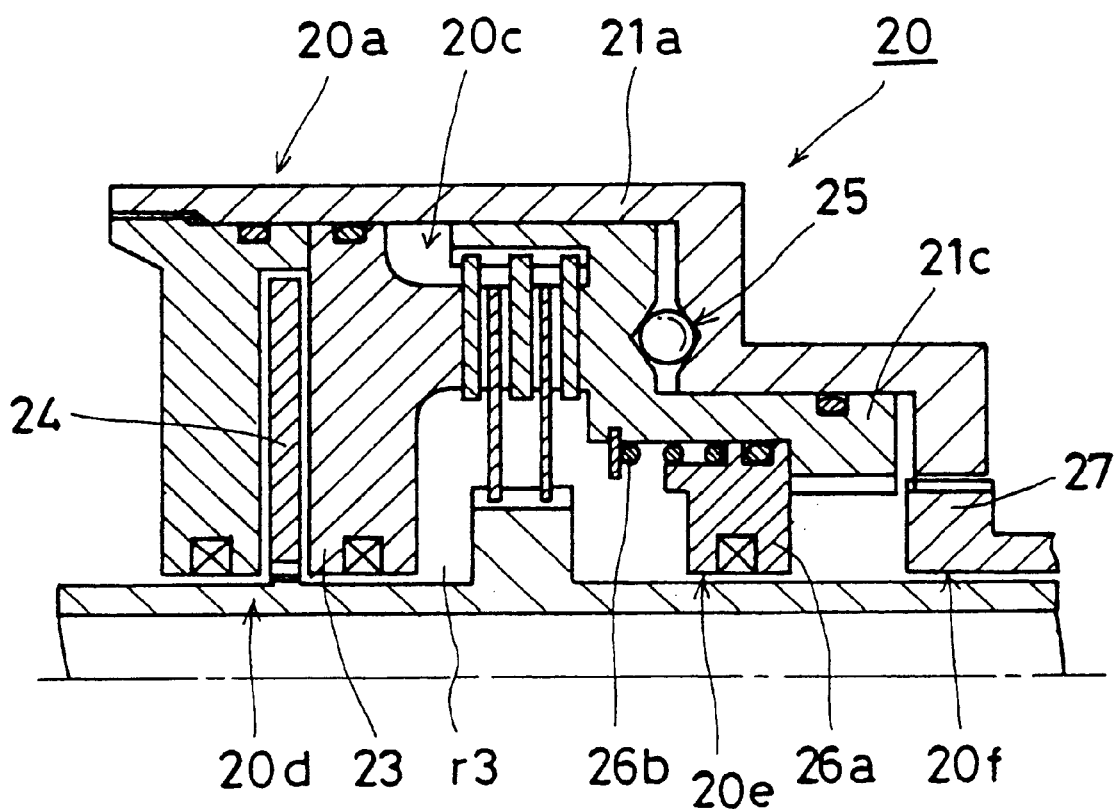
FIG. 9 is a partial sectional view showing essential portions of the drive force transmission apparatus according to the third embodiment, illustrating a third connection state.

FIGS. 7 to 9 schematically show essential portions of a drive force transmission apparatus according to a third embodiment of the present invention. A drive force transmission apparatus 20 includes an outer housing 20a, an inner shaft 20b, a main clutch 20c, first pressing-force generation means 20d, second pressing-force generation means 20e, and control means 20f. The outer housing 20a includes an outer case 21a, a cover member 21b, and an intermediate case 21c. The outer housing 20a and the inner shaft 20b define a chamber for accommodating the main clutch 20c, the first pressing-force generation means 20d, and the second pressing-force generation means 20e.

In the drive force transmission apparatus 20, the main clutch 20c is disposed between the inner shaft 20b and the intermediate case 21c but has substantially the same structure as that of the main clutch 10c of the above-described drive force transmission apparatus 10. Likewise, the first pressing-force generation means 20d has substantially the same structure as that of the first pressing-force generation means 10d. Thus, the component members of the main clutch 20c and the first pressing-force generation means 20d are denoted by corresponding numerals between 20–24, and the detailed description of the main clutch 20c and the first pressing-force generation means 20d will be omitted.

The second pressing-force generation means 20e includes a cam mechanism 25, a piston 26a serving as oil hydraulic pressure generation means, and a compression spring 26b. The cam mechanism 25 includes cam grooves 25a and 25b, which are formed in the opposed surfaces of the outer case 21a and the intermediate case 21c, respectively, and cam followers 25c, which are interposed between the cam grooves 25a and 25b. The intermediate case 21c is supported by the inner circumference of the outer case 21a in an axially slidable manner and is adapted to receive and press the main clutch 20c.

A changeover sleeve 27, which constitutes the control means 20f, is supported by the inner shaft 20b in an axially slidable manner and is always connected to the first propeller shaft f in a torque-transmittable manner. Also, the changeover sleeve 27 is selectively connected to the outer case 21a or the intermediate case 21c through slide motion thereof. The sliding operation of the changeover sleeve 27 is controlled by an unillustrated vacuum actuator.

The piston 26a serving as oil hydraulic pressure generation means is supported by the inner shaft 20b in a fluid-tight and axially slidable manner and faces a clutch chamber r3 in a manner capable of advancing into and retreating from the clutch chamber r3, the clutch chamber r3 being defined by the outer case 21a, the intermediate case 21c, and the operating piston 23. The piston 26a is urged to the retreat position thereof by the compression sprig 26b and faces a front end surface of the changeover sleeve 27. The clutch chamber r3 contains a predetermined amount of an operating fluid.

In the drive force transmission apparatus 20 having the above-described structure, the changeover sleeve 27 selectively establishes one of three connection states shown in FIGS. 7 to 9 through slide motion thereof.

In a first connection state shown in FIG. 7, the changeover sleeve 27 is slid forward to be connected to the intermediate case 21c and to shift the piston 26a to the advance position thereof against the compression spring 26b. In this first connection state, the intermediate case 21c is connected to the first propeller shaft f via the changeover sleeve 27, so that a drive force from the first propeller shaft f is input to the intermediate case 21c. When the main clutch 20c is frictionally engaged, the drive force is transmitted to the second propeller shaft g via the inner shaft 20b. Also, due to advancement of the piston 26a, the oil pressure of the clutch chamber r3 is increased.

Accordingly, when a rotational speed difference occurs between the first and second propeller shafts f and g, relative rotation occurs between the outer housing 20a and the inner shaft 20b. This causes a pressing force to be generated in the first pressing-force generation means 20d in accordance with the rotational speed difference to thereby press the operating piston 23 against the main clutch 20c. Thus, the main clutch 20c becomes frictionally engaged.

Thus, a torque corresponding to a rotational speed difference between the first and second propeller shafts f and g is transmitted from the first propeller shaft f to the second propeller shaft g. However, since an increased oil pressure of the clutch chamber r3 acts so as to reduce the movement of the operating piston 23 toward the main clutch 20c, the operating piston 23 presses the main clutch 20c by a reduced pressing force. Consequently, the frictional engagement force of the main clutch 20c is weakened accordingly, resulting in a reduced torque transmission between both the propeller shafts f and g.

Figure 18:
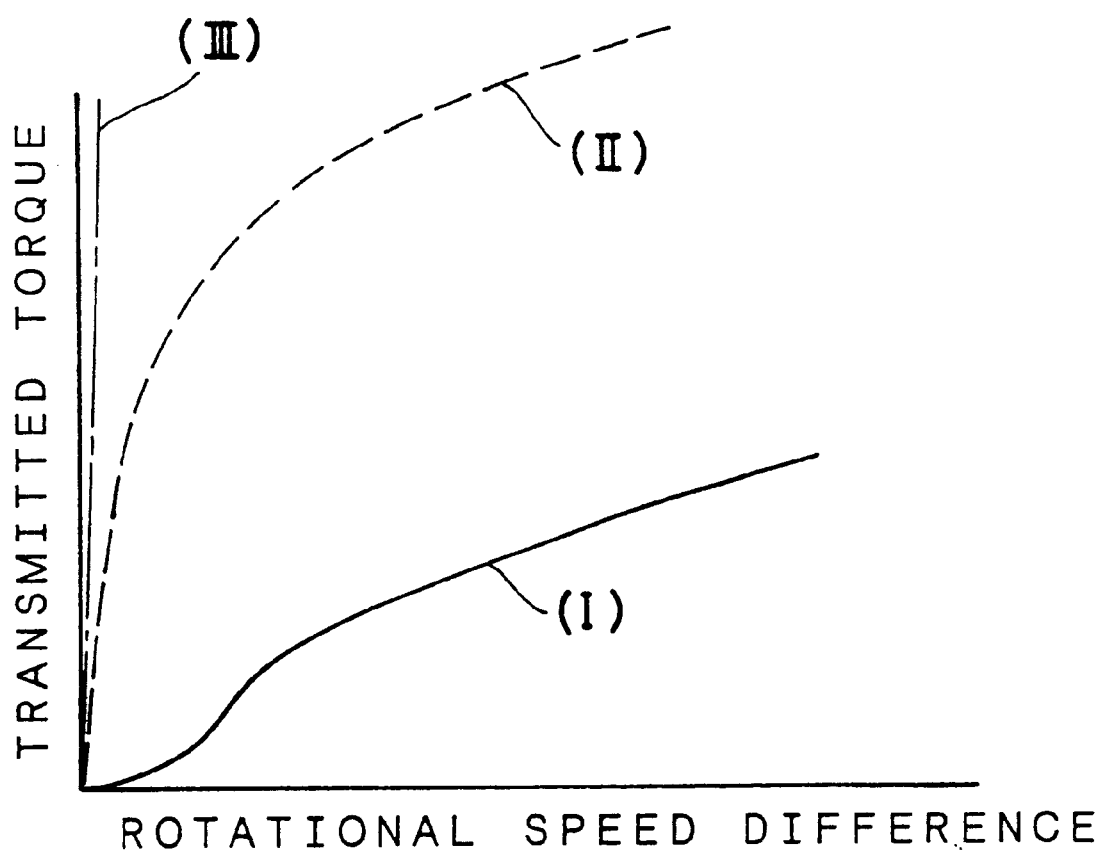
FIG. 18 is a graph showing torque transmission characteristics of the drive force transmission apparatus according to the third embodiment.

In FIG. 18, curve (I) represents a torque transmission characteristic of the drive force transmission apparatus 20 in the first connection state. Since the torque transmitted to the second propeller shaft g is relatively small in the first connection state. This state is suitable for ABS, vehicle stabilization control, and the like, and improves mileage.

When the drive force transmission apparatus 20 is in a second connection state as shown in FIG. 8, the changeover sleeve 27 is situated at a neutral position, where the changeover sleeve 27 is connected to the intermediate case 21c and is separated from the piston 26a. In this second connection state, the intermediate case 21c is connected to the first propeller shaft f via the changeover sleeve 27, so that a drive force from the first propeller shaft f is input to the intermediate case 21c. When the main clutch 20c is frictionally engaged, the drive force is transmitted to the second propeller shaft g via the inner shaft 20b. Also, the piston 26a is situated at its retreat position, and the clutch chamber r3 is at a normal oil pressure.

Accordingly, when a rotational speed difference occurs between the first and second propeller shafts f and g, relative rotation occurs between the outer housing 20a and the inner shaft 20b. This causes a pressing force to be generated in the first pressing-force generation means 20d in accordance with the rotational speed difference to thereby press the operating piston 23 against the main clutch 20c. Thus, the main clutch 20c becomes frictionally engaged, thereby transmitting a torque corresponding to a rotational speed difference between the first and second propeller shafts f and g from the first propeller shaft f to the second propeller shaft g.

In this case, since the clutch chamber r3 is at a normal oil pressure, no limitation is imposed on the movement of the operating piston 23 toward the main clutch 20c in contrast to the case of an increased oil pressure of the clutch chamber r3. Thus, as compared to the first connection state, the operating piston 23 presses the main clutch 20c by a larger force to thereby increase the frictional engagement force of the main clutch 20c. Consequently, a relatively large torque is transmitted from the first propeller shaft f to the second propeller shaft g.

In FIG. 18, curve (II) represents a torque transmission characteristic of the drive force transmission apparatus 20 in the second connection state. Since a relatively large torque corresponding to a rotational speed difference between the first and second propeller shafts f and g is transmitted to the second propeller shaft g, excellent driving stability is provided when traveling on a low-μ road such as a snow-covered road.

When the drive force transmission apparatus 20 is in a third connection state as shown in FIG. 9, the changeover sleeve 27 is situated at a retreat position, where the changeover sleeve 27 is connected to the outer case 21a and is separated from the piston 26a. In this third connection state, the outer case 21a is connected to the first propeller shaft f via the changeover sleeve 27, so that a drive force from the first propeller shaft f is input to the outer case 21a. When the main clutch 20c is frictionally engaged, the drive force is transmitted to the second propeller shaft g via the cam mechanism 25, the main clutch 20c, and the inner shaft 20b. Also, the piston 26a is situated at its retreat position, and the clutch chamber r3 is at a normal oil pressure.

Accordingly, when a rotational speed difference occurs between the first and second propeller shafts f and g, relative rotation occurs between the outer housing 20a and the inner shaft 20b. This causes a pressing force to be generated in the first pressing-force generation means 20d in accordance with the rotational speed difference to thereby press the operating piston 23 against the main clutch 20c. Thus, the main clutch 20c becomes frictionally engaged.

Also, relative rotation occurs between the outer case 21a and the intermediate case 21c, which is connected to the outer case 21a via the cam mechanism 25. This causes the intermediate case 21c to be pressed against the main clutch 20c through the action of the cam mechanism 25. That is, the main clutch 20c is pressed from both sides thereof by the operating piston 23 and the intermediate case 21c. Thus, the main clutch 20c becomes firmly engaged to thereby establish a directly engaged state between the first and second propeller shafts f and g.

In FIG. 18, curve (III) represents a torque transmission characteristic of the drive force transmission apparatus 20 in the third connection state. Since a larger torque than that in the second connection state is transmitted to the second propeller shaft g, the traveling performance of the vehicle is improved when traveling under sever driving conditions, such as an attempt to extract a wheel trapped in a gutter or the like, traveling on a rough road, etc.

Figure 10:
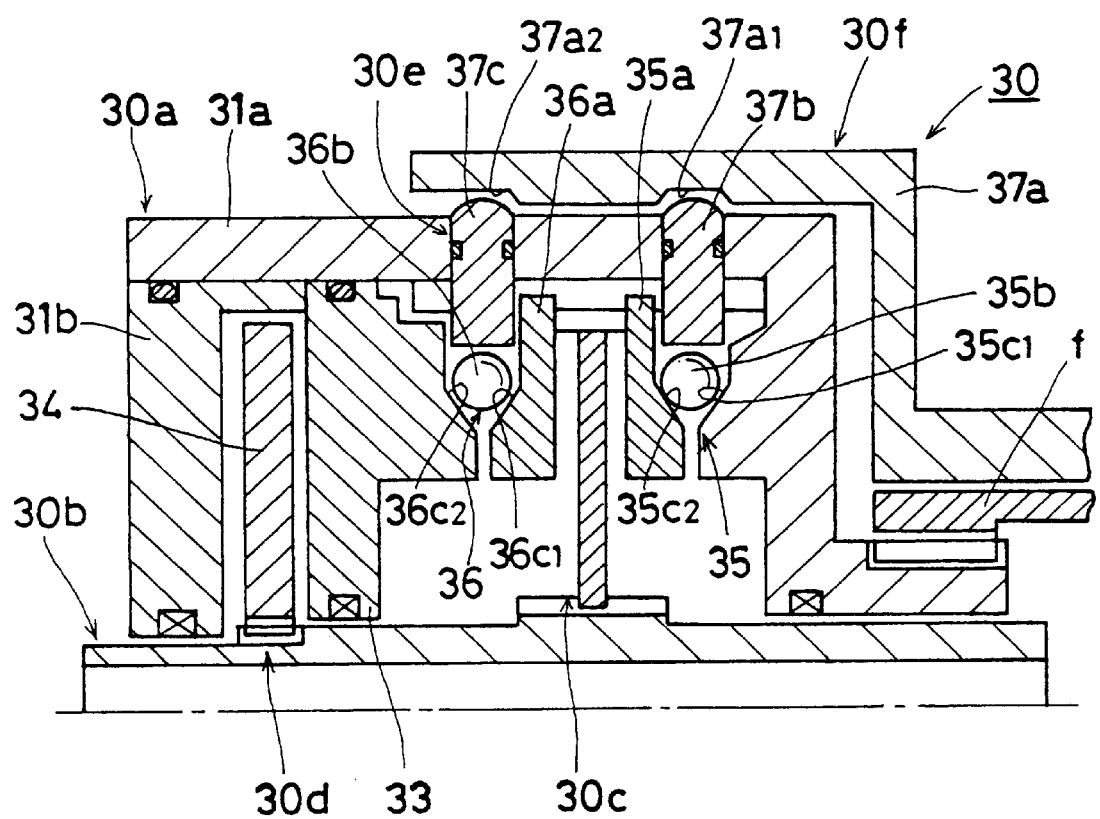
FIG. 10 is a partial sectional view showing essential portions of a drive force transmission apparatus according to still a fourth embodiment of the present invention.

FIG. 10 schematically shows essential portions of a drive force transmission apparatus according to a fourth embodiment of the present invention. A drive force transmission apparatus 30 includes an outer housing 30a, an inner shaft 30b, a main clutch 30c, first pressing-force generation means 30d, second pressing-force generation means 30e, and control means 30f.

The outer housing 30a includes an outer case 31a and a cover member 31b and is connected to the first propeller shaft f through the outer case 31a in a torque-transmittable manner. The first pressing-force generation means 30d has the same structure as that of the first pressing-force generation means 10d of the drive force transmission apparatus 10 and includes an operating piston 33 and a rotor 34.

The second pressing-force generation means 30e includes first and second cam mechanisms 35 and 36, respectively. The first cam mechanism 35 includes a first cam member 35a and a plurality of first cam followers 35b. The second cam mechanism 36 includes a second cam member 36a and a plurality of second cam followers 36b. The first cam followers 35b are interposed between cam grooves 35c1 and 35c2 formed in the opposed surfaces of the first cam member 35a and the outer case 31a, respectively. The second cam followers 36b are interposed between cam grooves 36c1 and 36c2 formed in the opposed surfaces of the second cam member 36a and the operating piston 33, respectively. The main clutch 30c is a frictional single-disc clutch interposed between the first and second cam mechanisms 35 and 36.

The control means 30f includes a changeover sleeve 37a, a plurality of first operating rods 37b, and a plurality of second operating rods 37c. The changeover sleeve 37a is supported by the outer case 31a and the first propeller shaft f in an axially slidable manner. The first operating rods 37b and the second operating rods 37c are supported by the outer case 31a in a slidably manner such that they radially penetrate the outer case 31a. The inner ends of the first and second operating rods 37b and 37c face spaces defined between the cam grooves 35c1 and 35c2 and between the cam grooves 36c1 and 36c2, respectively, and outer ends thereof face annular first depression 37a1 and second depression 37a2, respectively, formed in the inner circumference of the changeover sleeve 37a. The changeover sleeve 37a is controlled by an unillustrated vacuum actuator.

In the drive force transmission apparatus 30 having the above-described structure, the changeover sleeve 37a establishes three slide states, namely a first slide state which is a neutral state shown in FIG. 10, a second slide state in which the changeover sleeve 37a is slid to the right of the neutral-state-position, and a third slide state in which the changeover sleeve 37a is slid to the left of the neutral-state-position.

In the first slide state as shown in FIG. 10, the operating rods 37b and 37c are positioned in the depressions 37a1 and 37a2, respectively, formed in the changeover sleeve 37a. In this state, the operating rods 37b and 37c are not pressed by the changeover sleeve 37a, and the cam followers 35b and 36b are in a free state. Accordingly, both the first and second cam mechanisms 35 and 36 are inactive to thereby render the function of the main clutch 30c ineffective. Thus, a drive force input to the outer case 31a from the first propeller shaft f is not transmitted to the inner shaft 30b, so that the vehicle is in two-wheel-drive.

Figure 19:
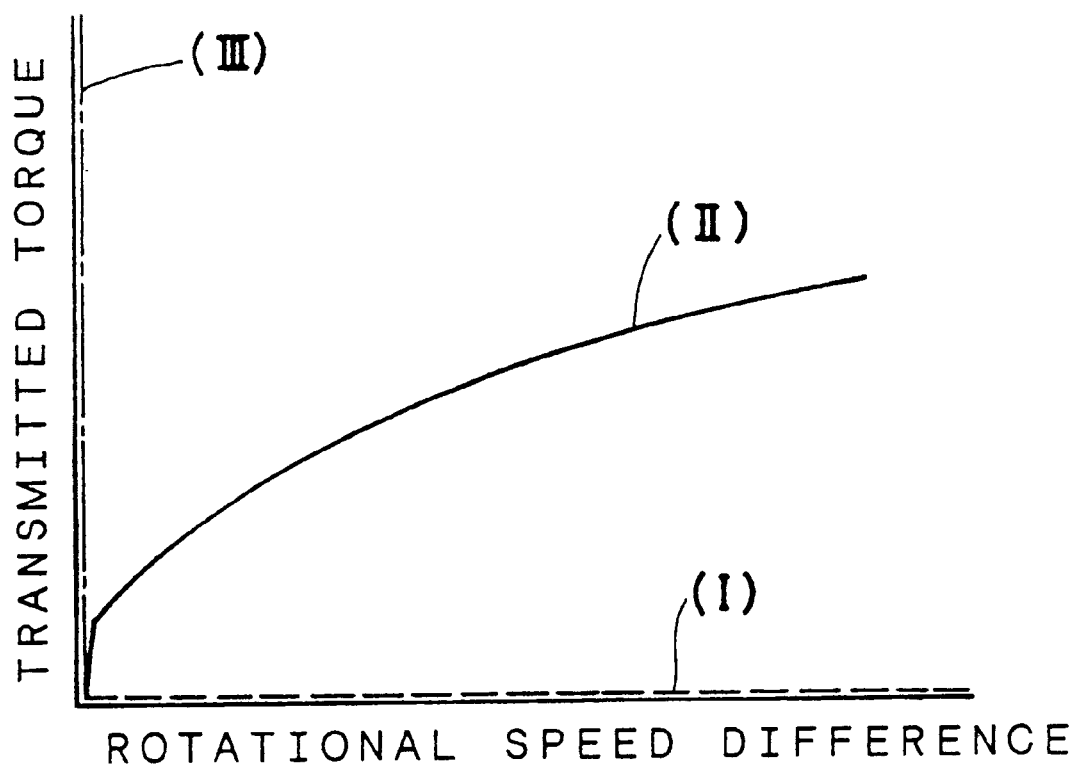
FIG. 19 is a graph showing torque transmission characteristics of the drive force transmission apparatus according to the fourth embodiment.

In FIG. 19, curve (I) represents a torque transmission characteristic of the drive force transmission apparatus 30 in the first slide state. Since no torque is transmitted to the second propeller shaft g even when a rotational speed difference occurs between the first and second propeller shafts f and g. This state is suitable for ABS control, vehicle stabilization control, braking, and the like, and improves mileage.

In the second slide state in which the changeover sleeve 37a is slid to the right of the first-slide-state-position shown in FIG. 10, the changeover sleeve 37a slides onto the head portions of the first operating rods 37b. Thus, the first operating rods 37b are pressed inward to thereby press the first cam followers 35b against the cam grooves 35c1 and 35c2, so that the rotation of the outer case 31a causes the first cam mechanism 35 to operate. As a result, the first cam member 35a presses the main clutch 30c to thereby press the second cam member 36a toward the operating piston 33, so that a gap between the second cam member 36a and the operating piston 33 is narrowed by a predetermined amount.

Accordingly, when a pressing force is generated in the first pressing-force generation means 30d due to the occurrence of a rotational speed difference between the first and second propeller shafts f and g, the thus-generated pressing force presses the operating piston 33 against the main clutch 30c. Also, the first cam mechanism 35 receives the main clutch 30c to thereby bring the main clutch 30c into a frictionally engaged state in accordance with a rotational speed difference between the outer housing 30a and the inner shaft 30b. Thus, a torque is transmitted from the first propeller shaft f to the second propeller shaft g. That is, the vehicle is in real-time four-wheel-drive.

In FIG. 19, curve (II) represents a torque transmission characteristic of the drive force transmission apparatus 30 in the second slide state. Since a torque is transmitted from the first propeller shaft f to the second propeller shaft g in accordance with a rotational speed difference therebetween, the traveling performance can be improved when traveling on a low-$\mu$ road such as a snow-covered road.

In the third slide state in which the changeover sleeve 37a is slid to the left of the first-slide-state-position shown in FIG. 10, the changeover sleeve 37a slides onto the head portions of the first and second operating rods 37b and 37c. Thus, the first and second operating rods 37b and 37c are pressed inward to thereby press the first and second cam followers 35b and 36b against the cam grooves 35c1 and 35c2 and the cam grooves 36c1 and 36c2, respectively, so that the first and second cam mechanisms 35 and 36 operate. As a result, the first and second cam members 35a and 36a press the main clutch 30c from both sides thereof. Thus, the main clutch 20c becomes firmly engaged to thereby establish a directly engaged state between the first and second propeller shafts f and g.

In FIG. 19, curve (III) represents a torque transmission characteristic of the drive force transmission apparatus 30 in the third slide state. Since a larger torque than that in the second slide state is transmitted to the second propeller shaft g, the traveling performance of the vehicle is improved when traveling under sever traveling conditions, such as an attempt to extract a wheel trapped in a gutter or the like, traveling on a rough road, etc.

Figure 11:
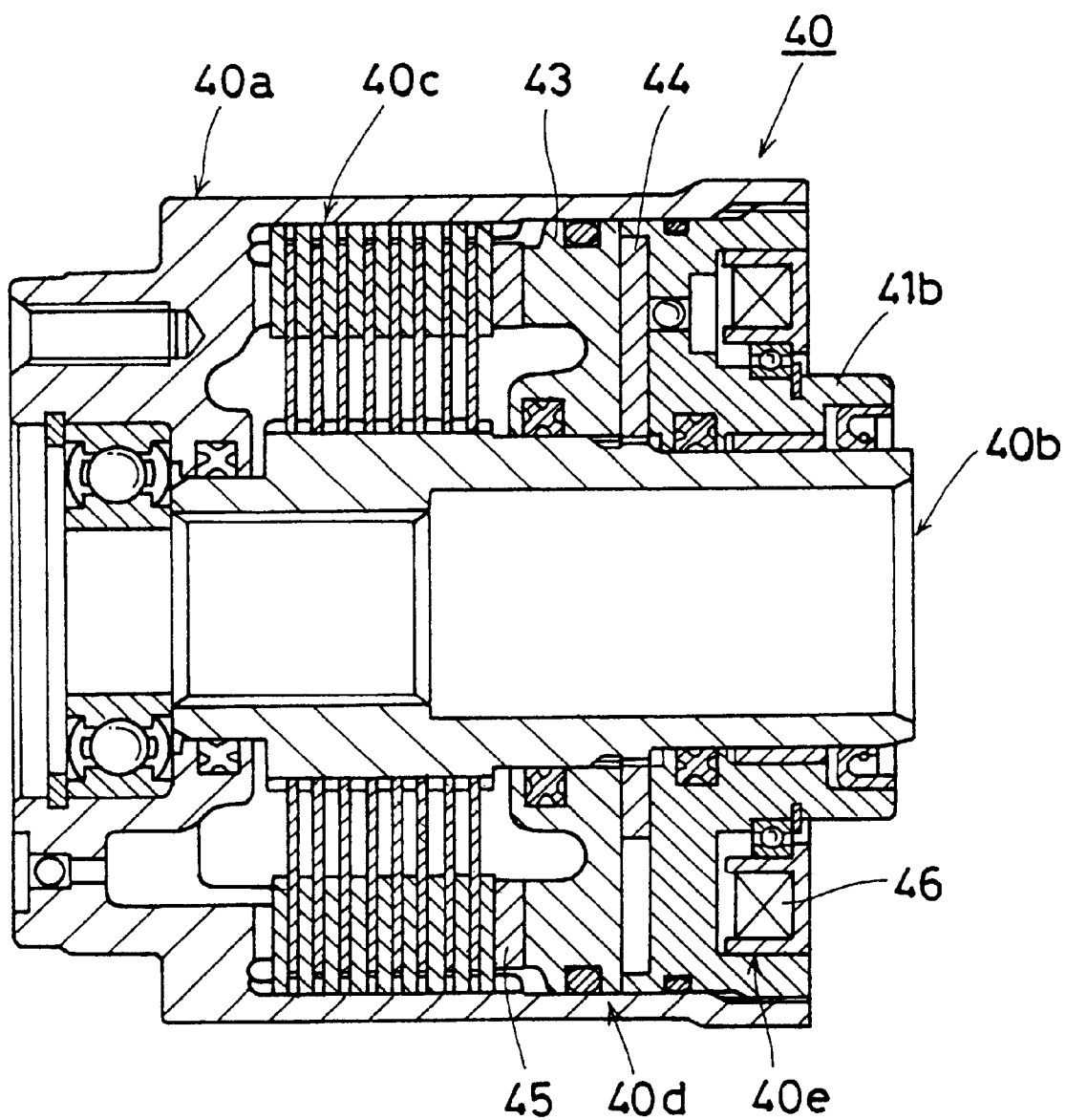
FIG. 11 is a sectional view showing a drive force transmission apparatus according to a fifth embodiment of the present invention.

FIG. 11 shows a drive force transmission apparatus according to a fifth embodiment of the present invention. A drive force transmission apparatus 40 includes an outer housing 40a, an inner shaft 40b, a frictional clutch 40c, pressing-force generation means 40d, and force-transmission limiting means 40e.

In the drive force transmission apparatus 40, the outer housing 40a, the inner shaft 40b, the frictional clutch 40c, and the pressing-force generation means 40d have substantially the same structures as those of the outer housing 10a, the inner shaft 10b, the main clutch 10c, and the first pressing-force generation means 10d in the above-described drive force transmission apparatus 10. However, the drive force transmission apparatus 40 is significantly different from the drive force transmission apparatus 10 in that the force-transmission limiting means 40e is employed in place of the second pressing-force generation means 10e.

Accordingly, in the drive force transmission apparatus 40, the same component members and portions as those of the drive force transmission apparatus 10 are denoted by corresponding numerals between 40–46, and their detailed description will be omitted. The description below primarily encompasses the force-transmission limiting means 40e added to the drive force transmission apparatus 40 and relevant items.

In the drive force transmission apparatus 40, the pressing-force generation means 40d is disposed between the outer housing 40a and the inner shaft 40b and between the cover member 41b and the frictional clutch 40c. Like the control means 10f of the drive force transmission apparatus 10, the force-transmission limiting means 40e includes an armature 45 serving as a movable member and an electromagnet 46.

The armature 45, which constitutes the force-transmission limiting means 40e, has an annular shape and is positioned in an axially movable manner between the frictional clutch 40c and an operating piston 43, which constitutes the pressing-force generation means 40d. The electromagnet 46, which constitutes the force-transmission limiting means 40e and has an annular shape, is supported by the cover member 41b to be located on the outer side thereof. The electromagnet 46 is opposed to the cover member 41b, a rotor 44, the operating piston 43, and the armature 45.

Thus, in the force-transmission limiting means 40e, when the electromagnet 46 is energized, a magnetic field is generated through the electromagnet 46, the rotor 44, the operating piston 43, and the armature 45, so that the armature 45 and the operating piston 43 are attracted toward the electromagnet 46 due to magnetic induction.

In the drive force transmission apparatus 40 having the above-described structure, when the electromagnet 46, which constitutes the force-transmission limiting means 40e, is de-energized, the operating piston 43 and the armature 45a are free from any restrictive force from the electromagnet 46. Thus, the pressing-force generation means 40d is ready to fully exhibit the intrinsic function thereof. Therefore, when a rotational speed difference occurs between the first and second propeller shafts f and g, a torque corresponding to the rotational speed difference is transmitted from the first propeller shaft f to the second propeller shaft g. Thus, the vehicle is in real-time four-wheel-drive. The graph shown in FIG. 20A represents a torque transmission characteristic of the drive force transmission apparatus 40 in this state.

On the other hand, in the drive force transmission apparatus 40, when the electromagnet 46, which constitutes the force-transmission limiting means 40e, is energized, a magnetic field is generated through the electromagnet 46, the rotor 44, the operating piston 43, and the armature 45, so that the armature 45 and the operating piston 43 are attracted toward the electromagnet 46 due to magnetic induction. As a result, this attracting force restrains a pressing force generated in the pressing-force generation means 40d from being transmitted to the frictional clutch 40c. Therefore, the generated pressing force is transmitted to the frictional clutch 40c via the operating piston 43 when the pressing force generated in the pressing-force generation means 40d exceeds the attracting force.

Thus, in the drive force transmission apparatus 40, while a rotational speed difference between the first and second propeller shafts f and g is relatively small, a torque corresponding to the rotational speed difference is not transmitted from the first propeller shaft f to the second propeller shaft g. The graph shown in FIG. 20B represents a torque transmission characteristic of the drive force transmission apparatus 40 in this state.

Figure 20A:
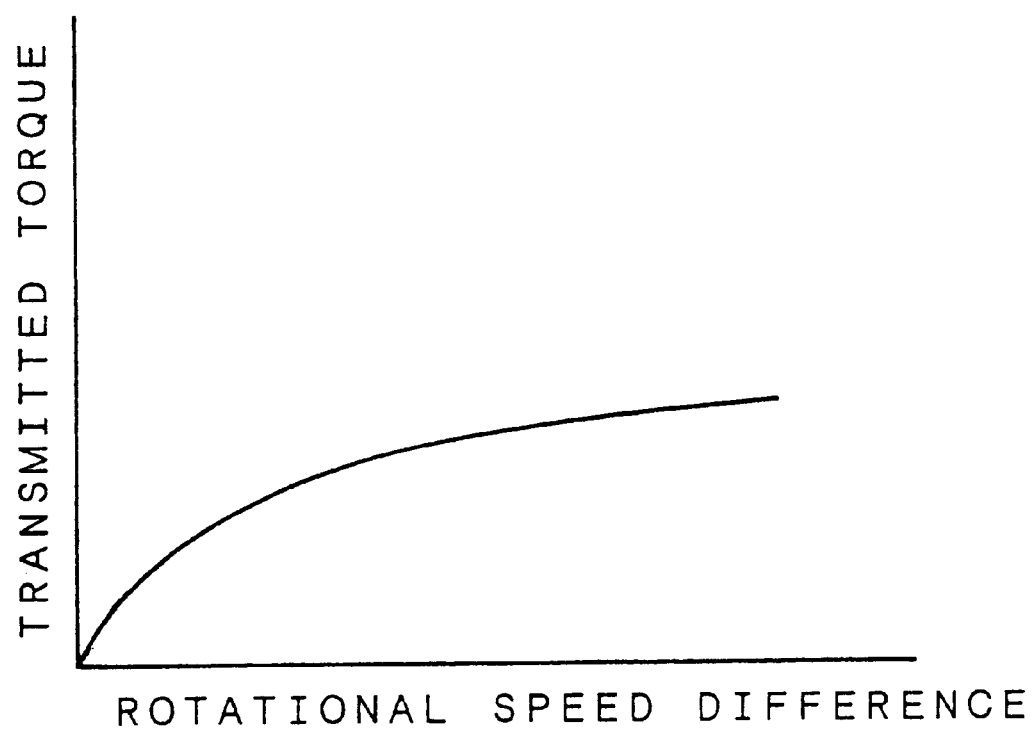
FIGS. 20A and 20B are graphs showing torque transmission characteristics of the drive force transmission apparatus according to the fifth embodiment.
Figure 20B:
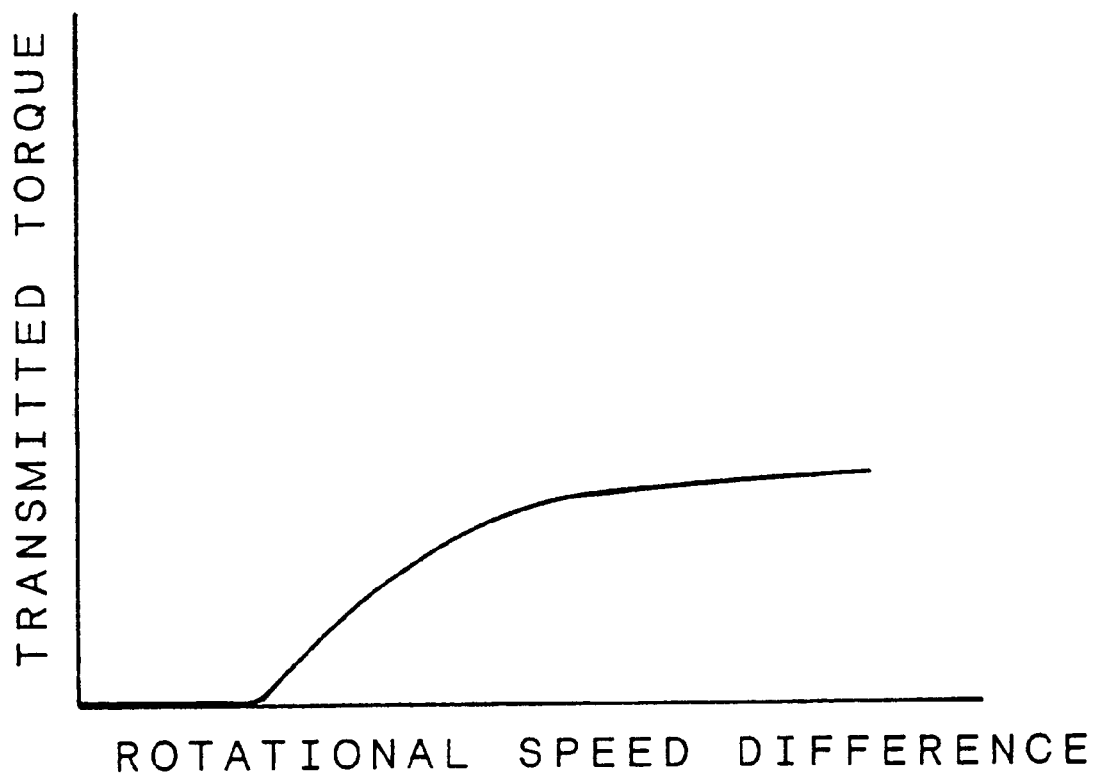

As described above, through control of the force-transmission limiting means 40e, the drive force transmission apparatus 40 instantaneously changes, either automatically or manually, the torque transmission characteristic of FIG. 20A to and from that of FIG. 20B. When the torque transmission characteristic of FIG. 20A is established, the vehicle is in a normal mode, i.e. in real-time four-wheel-drive. When the torque transmission characteristic of FIG. 20B is established, the vehicle is in an economical mode suited for vehicle stabilization control, ABS control, and the like.

Figure 12:
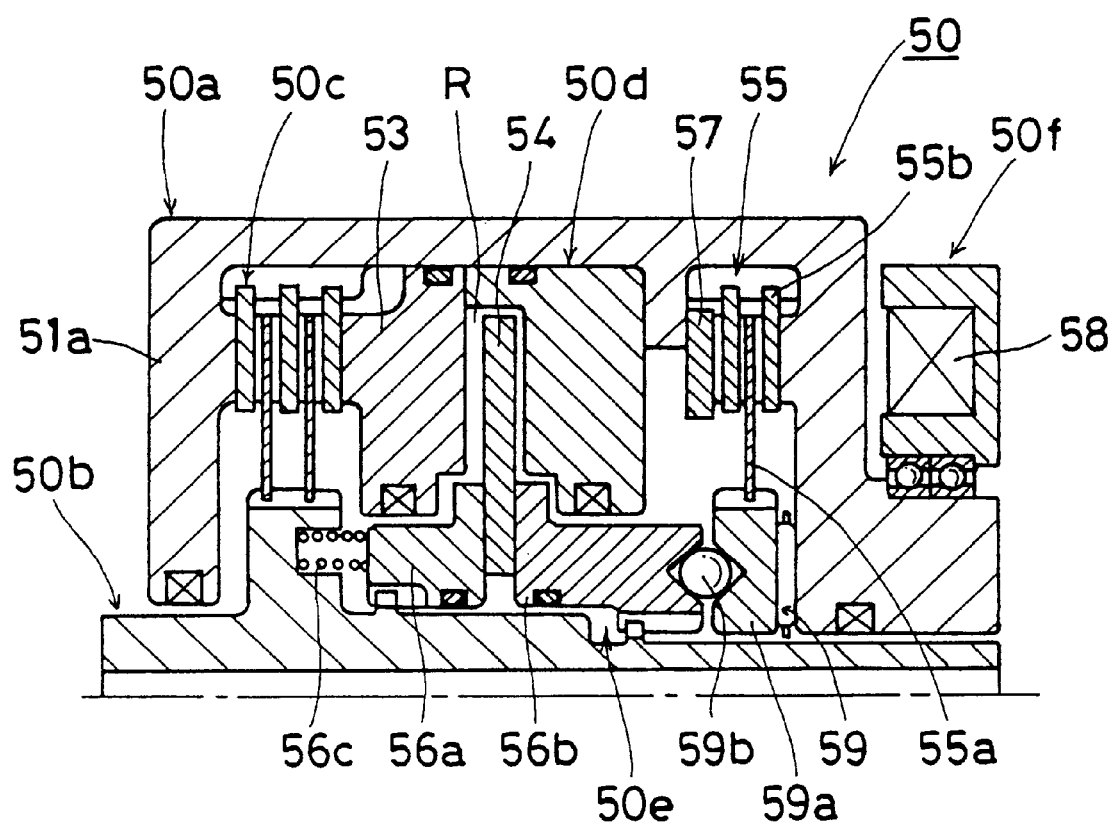
FIG. 12 is a partial sectional view showing essential portions of a drive force transmission apparatus according to a sixth embodiment of the present invention, illustrating a first attachment state.
Figure 13:
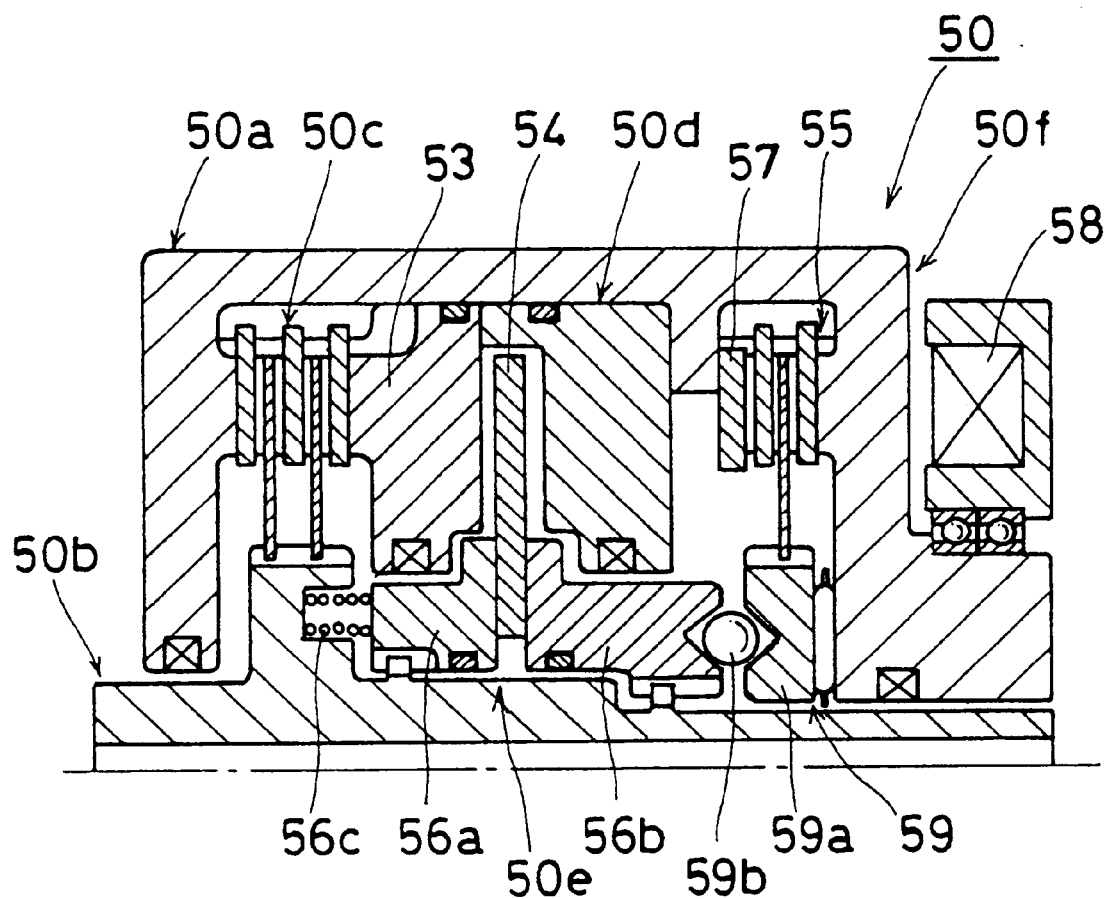
FIG. 13 is a partial sectional view showing essential portions of the drive force transmission apparatus according to the sixth embodiment, illustrating a second attachment state.
Figure 14:
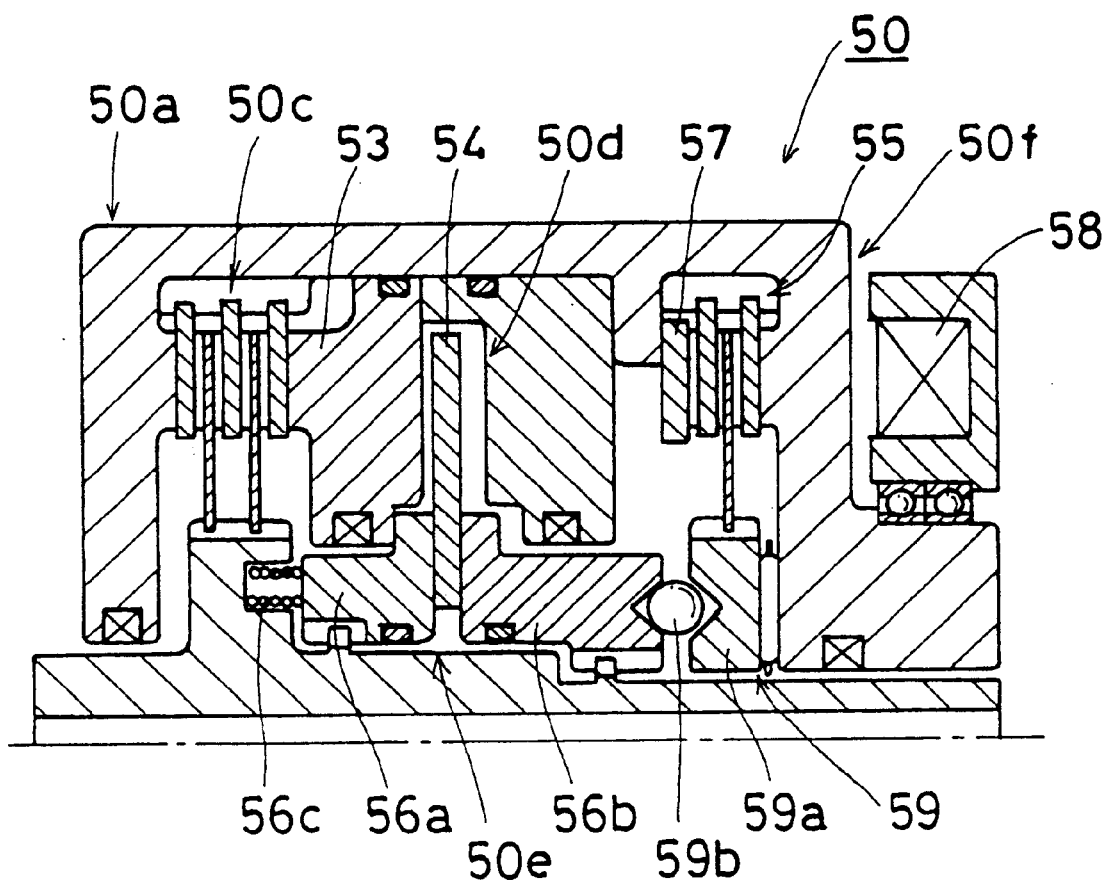
FIG. 14 is a partial sectional view showing essential portions of the drive force transmission apparatus according to the sixth embodiment, illustrating a third attachment state.

FIGS. 12 to 14 schematically show essential portions of a drive force transmission apparatus according to a sixth embodiment of the present invention. A drive force transmission apparatus 50 includes an outer housing 50a, an inner shaft 50b, a main clutch 50c, pressing-force generation means 50d, fixing means 50e, and control means 50f.

In the drive force transmission apparatus 50, the main clutch 50c, a pilot clutch 55 constituting the control means 50f, an armature 57 serving as drive means, and an electromagnet 58 have substantially the same structures as those of the main clutch 10c, the pilot clutch 15, and the control means 10f of the above-described drive force transmission apparatus 10. Thus, their component members and component portions are denoted by corresponding numerals between 50–59, and their detailed description will be omitted.

The pressing-force generation means 50d includes an operating piston 53 and a rotor 54 disposed within a fluid chamber R. The fixing means 50e includes a pair of holding members 56a and 56b and a compression spring 56c.

The first holding member 56a, which constitutes the fixing means 50e, is supported by the inner shaft 50b at the side where the main clutch 50c is disposed. The first holding member 56a is axially slidable with respect to the inner shaft 50b but is prevented from rotating with respect thereto. One end of the first holding member 56a faces the fluid chamber R and is opposed to one side surface of the rotor 54 in a manner capable of advancing toward and retreating from the rotor 54. The compression spring 56c interposed between the inner shaft 50b and the first holding member 56a causes the first holding member 56a to resiliently abut the side surface of the rotor 54.

The second holding member 56b, which constitutes the fixing means 50e, is supported by the inner shaft 50b at the side where the pilot clutch 55 is disposed. The second holding member 56b is axially slidable with respect to the inner shaft 50b but is prevented from rotating with respect thereto. One end of the second holding member 56b faces the fluid chamber R and is opposed to the other side surface of the rotor 54 in a manner capable of advancing toward and retreating from the rotor 54.

The control means 50e includes the pilot clutch 55 and a cam mechanism 59. A clutch disc 55a of the pilot clutch 55 is supported by a cam member 59a, which constitutes the cam mechanism 59, such that it is prevented from rotating relative to the inner shaft 50b but is allowed to axially move relative thereto. Clutch plates 55b are supported by the inner circumference of the outer case 51a such that they are prevented from rotating relative to the outer case 51a but are allowed to axially move relative thereto.

The cam mechanism 59 includes the cam member 59a and a plurality of cam followers 59b interposed between a pair of cam grooves formed in the opposed surfaces of the cam member 59a and the second holding member 56b. Accordingly, when the cam mechanism 59 is operated, the second holding member 56b is slid toward the rotor 54 to hold the rotor 54 in cooperation with the first holding member 56a.

In the drive force transmission apparatus 50 having the above-described structure, through the energizing/de-energizing of the electromagnet 58, the rotor 54 may assume any of three attachment states shown in FIGS. 12 to 14.

In the first attachment state shown in FIG. 12, the electromagnet 58 is de-energized, and the functions of the pilot clutch 55 and the cam mechanism 59 are ineffective. Accordingly, the second holding member 56 is situated at its retreat position, and the rotor 54 is in a free state because of release from gripping by the first and second holding members 56a and 56b. Thus, even when relative rotation occurs between the outer housing 50a and the inner shaft 50b, the rotor 54 does not rotate, so that no pressing force is generated in the pressing-force generation means 50d. Accordingly, the main clutch 50c is not operated, and no torque is transmitted from the first propeller shaft f to the second propeller shaft g. Therefore, the vehicle is in two-wheel-drive.

In FIG. 19, curve (I) represents a torque transmission characteristic of the drive force transmission apparatus 50 in the first attachment state. Since no torque is transmitted to the second propeller shaft g even when a rotational speed difference occurs between the first and second propeller shafts f and g. This state is suitable for ABS control, vehicle stabilization control, braking, and the like, and improves mileage.

In the second attachment state shown in FIG. 13, wherein a relatively small current is supplied to the electromagnet 58, the electromagnet 58 attracts the armature 57 and the pilot clutch 55 with a relatively weak attracting force, thereby frictionally engaging the pilot clutch 55 with a relatively weak engagement force. Thus, the cam mechanism 59 operates to advance the second holding member 56b, causing the second holding member 56b to press the rotor 54 with such a small pressing force that the compression spring 56c is not compressed.

Accordingly, the rotor 54 is held between the first and second holding members 56a and 56b by a force equivalent to or slightly smaller than a force of compressing the compression spring 56c. Thus, the rotor 54 rotates in accordance with relative rotation between the outer housing 50a and the inner shaft 50b, thereby generating a pressing force. The thus-generated pressing force causes the main clutch 50c to frictionally engage in accordance with a rotational speed difference between the first and second propeller shafts f and g. Accordingly, a torque is transmitted from the first propeller shaft f to the second propeller shaft g in accordance with a rotational speed difference therebetween. Thus, the vehicle is in real-time four-wheel-drive.

In FIG. 19, curve (II) represents a torque transmission characteristic of the drive force transmission apparatus 50 in the second attachment state. Since a torque corresponding to a rotational speed difference between the first and second propeller shafts f and g is transmitted to the second propeller shaft g, the traveling performance of the vehicle is improved when traveling on a low-$\mu$ road such as a snow-covered road.

In the third attachment state shown in FIG. 14, wherein a relatively large current is supplied to the electromagnet 58, the electromagnet 58 attracts the armature 57 and the pilot clutch 55 with a relatively strong attracting force, thereby frictionally engaging the pilot clutch 55 with a relatively strong engagement force. Thus, the cam mechanism 59 operates to advance the second holding member 56b, causing the second holding member 56b to press the rotor 54 with such a large pressing force that the compression spring 56c is compressed.

Accordingly, the rotor 54 is firmly held between the first and second holding members 56a and 56b and presses the main clutch 50c via the operating piston 53 to thereby firmly engage the main clutch 50c. Thus, the first and second propeller shafts f and g are in a directly engaged state.

In FIG. 19, curve (III) represents a torque transmission characteristic of the drive force transmission apparatus 50 in the third attachment state. Since a larger torque than that in the second attachment state is transmitted to the second propeller shaft g, the traveling performance of the vehicle is improved when traveling under sever traveling conditions, such as an attempt to extract a wheel trapped in a gutter or the like, traveling on a rough road, etc.

Obviously, numerous modifications and variations of the present invention are possible in light of the above teachings. It is therefore to be understood that within the scope of the appended claims, the present invention may be practiced otherwise than as specifically described herein.

What is claimed is:

1. A drive force transmission apparatus comprising:

inner and outer rotatable members supported coaxially and in a relatively rotatable manner, one of said inner and outer rotatable members being connected to a driving shaft and the other of said inner and outer rotatable members being connected to a driven shaft;

a frictional clutch provided between said inner and outer rotatable members in order to transmit torque therebetween through frictional engagement;

first pressing-force generation means provided between said inner and outer rotatable members for generating a pressure force in accordance with a rotational speed difference between said driving and driven shafts and for transmitting the pressing force to said frictional clutch to thereby bring said frictional clutch into a frictionally engaged state;

a second pressing-force generation means disposed opposite to said first pressing-force generation means with respect to said frictional clutch and adapted to generate a pressing force to bring said frictional clutch into a frictionally engaged state; and a control device operable to generate the pressure force independent of the rotational speed difference.

2. A drive force transmission apparatus according to claim 1, wherein said second pressing-force generation means comprises a second frictional clutch, whose frictionally engagement is controlled by said control device, and pressing-force conversion means for converting a frictional engagement force of said second frictional clutch to a pressing force applied to said frictional clutch.

3. A drive force transmission apparatus according to claim 2, wherein said control device comprises a movable member for pressing said second frictional clutch through movement thereof and an electromagnet for controlling the movement of said movable member.

4. A drive force transmission apparatus according to claim 1, further comprising force-transmission limiting means for limiting the transmission of a pressing force generated by said first pressing-force generation means to said frictional clutch when a rotational speed difference between said driving and driven shafts is small.

5. A drive force transmission apparatus according to claim 1, wherein said frictional clutch is disposed between an intermediate rotatable member and said inner rotatable member, said intermediate rotatable member being coaxially and movably disposed within said outer rotatable member; said second pressing-force generation means comprises cam means, which is disposed between said outer and intermediate rotatable members and presses said intermediate rotatable member against said frictional clutch in accordance with relative rotation between said outer and intermediate rotatable members; and said control device comprises a connection member for selectively connecting said outer and intermediate rotatable members to either said driving shaft or said driven shaft.

6. A drive force transmission apparatus according to claim 1, wherein said second pressing-force generation means comprises first cam means, which is operated by said control device to press said frictional clutch, and second cam means, which is located between said frictional clutch and said first pressing-force generation means and is operated by said control device to press said frictional clutch; and said control device selectively establishes a state in which both said first and second cam means are inactive, a state in which only said first cam means is active, or a state in which both said first and second cam means are active.

\* \* \* \* \*